US008894151B2

(12) United States Patent
Poniatowski et al.

(10) Patent No.: US 8,894,151 B2
(45) Date of Patent: Nov. 25, 2014

(54) ADJUSTER AND HINGE FOR CHILD BOOSTER SEAT

(75) Inventors: Jeffrey Joseph Poniatowski, Royal Oak, MI (US); Rohanna Marie Lindhorst, Monroe, MI (US); Mark Anthony Brockman, Belle River (CA)

(73) Assignee: Clek Inc., Ontario (CA)

( * ) Notice: Subject to any disclaimer, the term of this patent is extended or adjusted under 35 U.S.C. 154(b) by 442 days.

(21) Appl. No.: 13/062,509

(22) PCT Filed: Sep. 8, 2009

(86) PCT No.: PCT/CA2009/001251
§ 371 (c)(1),
(2), (4) Date: Aug. 1, 2011

(87) PCT Pub. No.: WO2010/025571
PCT Pub. Date: Mar. 11, 2010

(65) Prior Publication Data
US 2011/0285183 A1 Nov. 24, 2011

Related U.S. Application Data

(60) Provisional application No. 61/191,069, filed on Sep. 5, 2008.

(51) Int. Cl.
*B60N 2/28* (2006.01)

(52) U.S. Cl.
CPC ............ *B60N 2/2893* (2013.01); *B60N 2/2851* (2013.01); *B60N 2/2872* (2013.01); *B60N 2/2866* (2013.01); *B60N 2/2878* (2013.01)
USPC ................... 297/342; 297/256.1; 297/256.13; 297/317; 297/440.15

(58) Field of Classification Search
USPC ........... 297/188.2, 250.1, 256.1, 256.13, 317, 297/342, 340, 341, 344.1, 440.15, 253, 329, 297/325; 248/429, 430
See application file for complete search history.

(56) References Cited

U.S. PATENT DOCUMENTS 1,251,714 A * 1/1918 Walton ...................... 297/378.12
3,404,917 A * 10/1968 Smith ........................ 297/256.1
3,632,165 A * 1/1972 Miller .......................... 297/254
3,645,548 A * 2/1972 Briner ....................... 297/216.11

(Continued)

FOREIGN PATENT DOCUMENTS

EP 0650864 A1 8/1994

OTHER PUBLICATIONS

International Search Report and Written Opinion mailed Mar. 11, 2009 in PCT/CA2009/001251.

*Primary Examiner* — David R Dunn
*Assistant Examiner* — Richard Lowry
(74) *Attorney, Agent, or Firm* — Morris & Kamlay LLP

(57) ABSTRACT

A child seat assembly for use on a vehicle seat includes a seat portion, a base and a backrest. The seat portion is adapted to be supported on the vehicle seat and includes a cavity. The base is disposed at least partially within the cavity of the seat portion. The seat portion is operatively coupled to the base for selective sliding movement of the seat portion in a longitudinal direction relative to the base. The backrest is coupled to the seat portion and pivots about an axis extending in a lateral direction in response to the sliding movement of the seat portion relative to the base.

13 Claims, 20 Drawing Sheets

(56) References Cited

U.S. PATENT DOCUMENTS

| | | | | |
|---|---|---|---|---|
| 3,848,937 | A * | 11/1974 | Harder, Jr. | 384/34 |
| 4,344,597 | A * | 8/1982 | Eimen | 248/561 |
| 4,378,101 | A * | 3/1983 | Kazaoka et al. | 248/429 |
| 4,492,408 | A * | 1/1985 | Lohr | 297/344.1 |
| 4,520,982 | A * | 6/1985 | Nishino | 248/430 |
| 4,565,344 | A * | 1/1986 | Iwami | 248/429 |
| 4,709,960 | A * | 12/1987 | Launes | 297/256.13 |
| 4,919,485 | A * | 4/1990 | Guichon | 297/440.23 |
| 5,466,044 | A * | 11/1995 | Barley et al. | 297/252 |
| 5,685,604 | A * | 11/1997 | Kain | 297/256.15 |
| 5,797,654 | A | 8/1998 | Stroud | |
| 5,810,436 | A | 9/1998 | Surot | |
| 5,845,968 | A * | 12/1998 | Lovie | 297/256.1 |
| 6,053,573 | A | 4/2000 | Nakagawa | |
| 6,082,819 | A * | 7/2000 | Jackson | 297/253 |
| 6,158,807 | A | 12/2000 | Hampton | |
| 6,183,044 | B1 * | 2/2001 | Koyanagi et al. | 297/256.16 |
| 6,375,260 | B1 * | 4/2002 | Hiramatsu et al. | 297/256.16 |
| 6,428,099 | B1 * | 8/2002 | Kain | 297/256.1 |
| 6,478,372 | B1 | 11/2002 | Lemmeyer | |
| 6,505,887 | B2 * | 1/2003 | Hampton | 297/256.1 |
| 6,666,506 | B2 * | 12/2003 | Burns et al. | 297/188.14 |
| 6,808,232 | B2 * | 10/2004 | Takizawa | 297/256.13 |
| 6,997,509 | B2 * | 2/2006 | Kain | 297/250.1 |
| 7,086,695 | B2 * | 8/2006 | Hosoya | 297/256.16 |
| 7,093,896 | B2 * | 8/2006 | Morita | 297/253 |
| 7,270,371 | B2 * | 9/2007 | Adragna et al. | 297/14 |
| 7,270,373 | B2 * | 9/2007 | Sakumoto | 297/216.11 |
| 7,273,256 | B2 | 9/2007 | Santamaria | |
| 7,328,946 | B2 * | 2/2008 | Hendrikus Van Montfort et al. | 297/253 |
| 7,427,103 | B2 * | 9/2008 | Weber | 297/228.13 |
| 7,467,825 | B2 * | 12/2008 | Jane Santamaria | 297/253 |
| 2004/0155509 | A1 * | 8/2004 | Smith, Jr. | 297/440.15 |
| 2004/0178669 | A1 | 9/2004 | Lady | |
| 2006/0181125 | A1 * | 8/2006 | Kespohl | 297/256.16 |
| 2006/0279116 | A1 * | 12/2006 | Munn et al. | 297/256.1 |
| 2008/0018155 | A1 * | 1/2008 | Smiley et al. | 297/341 |

* cited by examiner

ADJUSTER AND HINGE FOR CHILD BOOSTER SEAT

CROSS-REFERENCE TO RELATED APPLICATION

This application claims priority to and all the benefits of U.S. Provisional Application No. 61/191,069, filed on Sep. 5, 2008 and entitled "Adjuster And Hinge For Child Booster Seat".

BACKGROUND OF THE INVENTION

1. Field of the Invention

The invention relates to a child car seat for a toddler. More particularly, the invention relates to a child car seat including a reclining backrest.

2. Description of Related Art

Child car seats or safety seats are well known and typically include a backrest mounted to a seat portion. Often times, the backrest is pivotally coupled to the seat portion such that a recline angle of the backrest can be adjusted by moving the seat portion fore and aft. U.S. Pat. Nos. 7,086,695 and 7,273,256 disclose such child car seats.

Booster seats are also well known. Examples include those disclosed in U.S. Pat. Nos. 5,797,654 and 5,845,968. These booster seats differ from the above-mentioned child car seats in that they typically do not have a backrest mounted to the seat portion.

Some child car seats and booster seats are provided with a cup holder arrangement mounted to a side of the seat, as disclosed in U.S. Pat. Nos. 6,478,372 and 5,685,604.

It is desirable, to provide an improved child car seat with a backrest pivotally coupled to a seat portion wherein the seat portion is slidably movable fore and aft to selectively adjust a recline angle of the backrest. It is further desirable to provide a method for releasably securing the backrest to the seat portion such that the backrest can be easily coupled and decoupled with the seat portion. Finally, it is desirable to provide a cup holder detachably mounted to the seat portion of the child car seat.

SUMMARY OF THE INVENTION

According to one aspect of the invention, a child seat assembly for use on a vehicle seat includes a seat portion, a base and a backrest. The seat portion is adapted to be support on the vehicle seat and includes a cavity. The base is disposed at least partially within the cavity of the seat portion. The seat portion is operatively coupled to the base for selective sliding movement of the seat portion in a longitudinal direction relative to the base. The backrest is coupled to the seat portion and pivots about an axis extending in a lateral direction in response to the sliding movement of the seat portion relative to the base.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
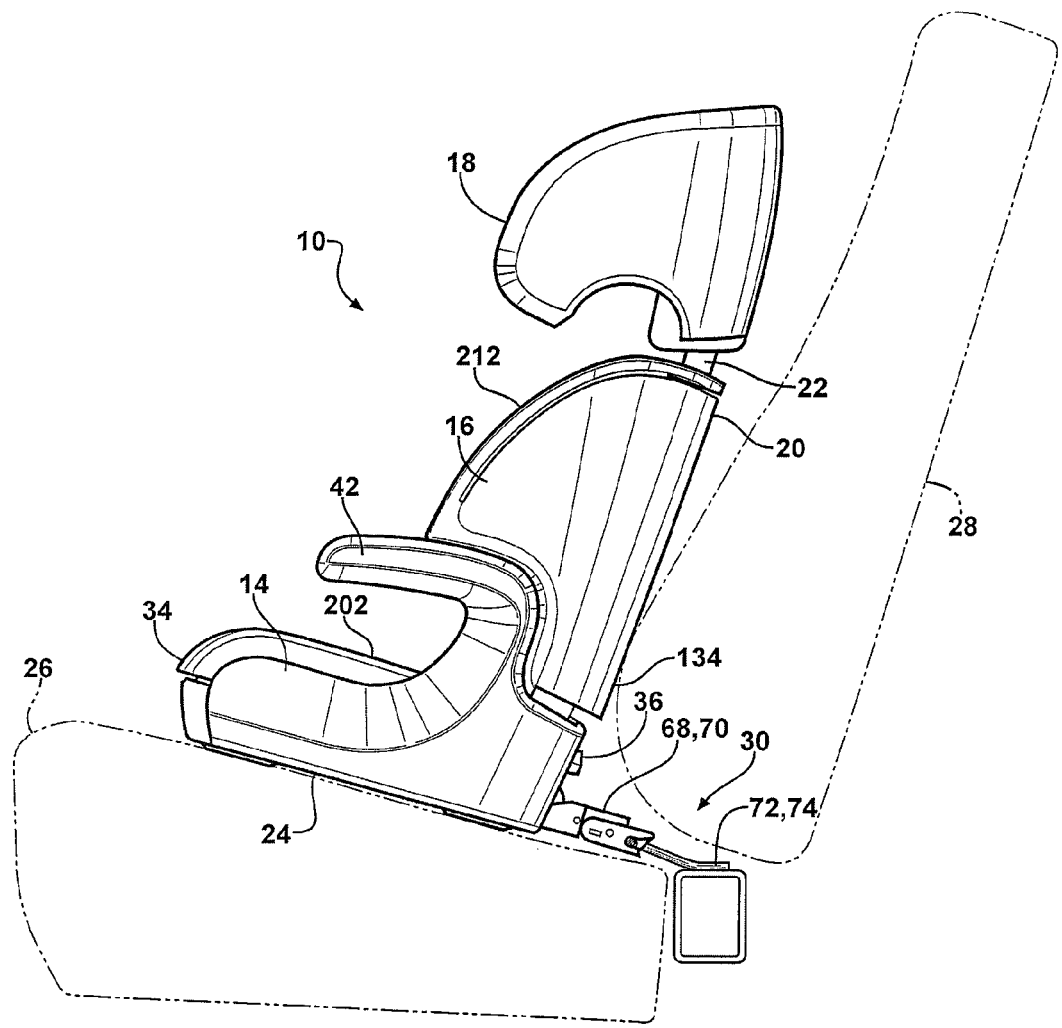
FIG. 1 is a side view of a child seat assembly according to a first embodiment of the invention with a backrest in an upright position and a base partially extending from a seat portion.
Figure 2:
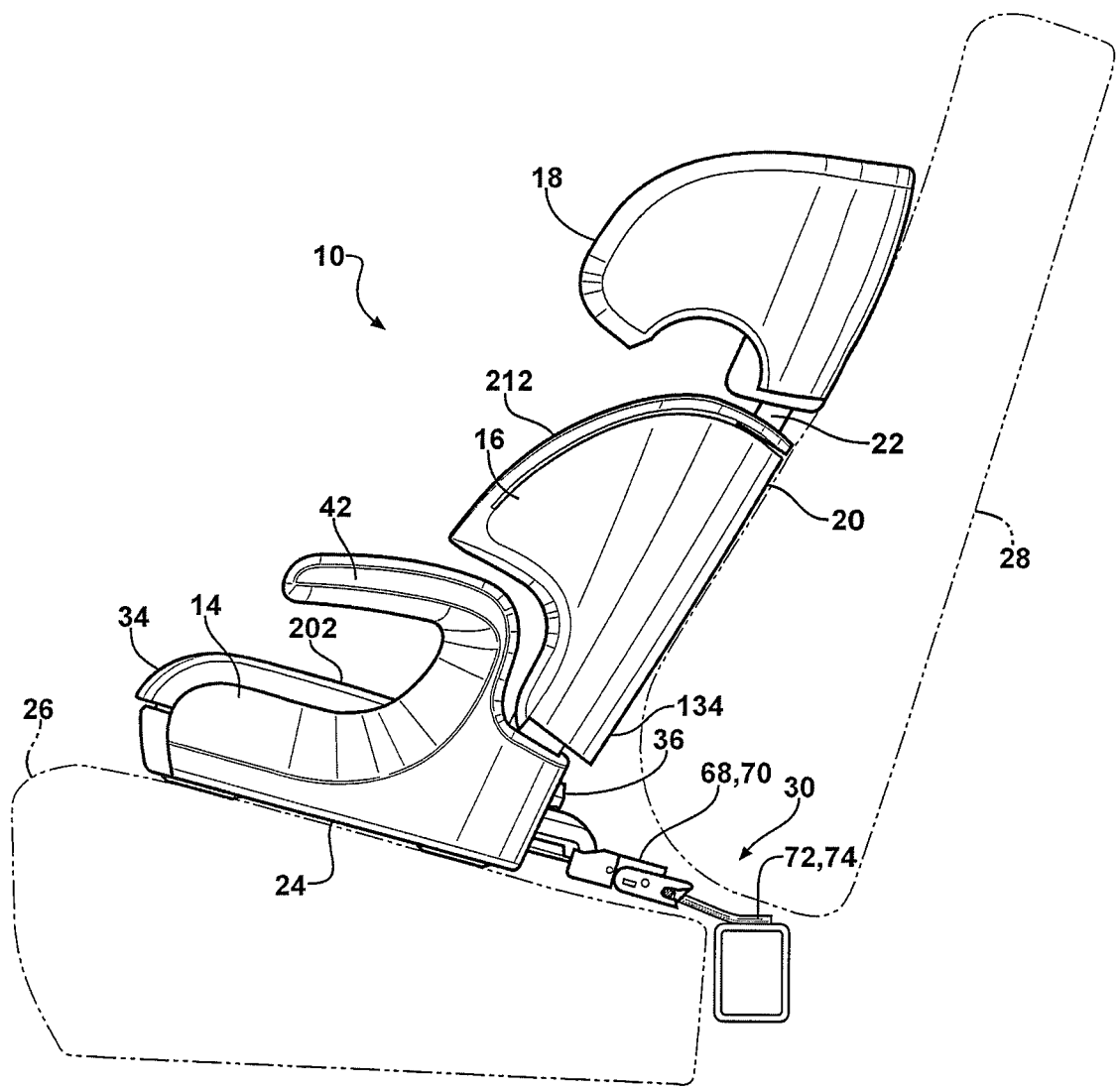
FIG. 2 is a side view of the child seat assembly with the backrest in a reclined position and the base fully extended from the seat portion.
Figure 3:
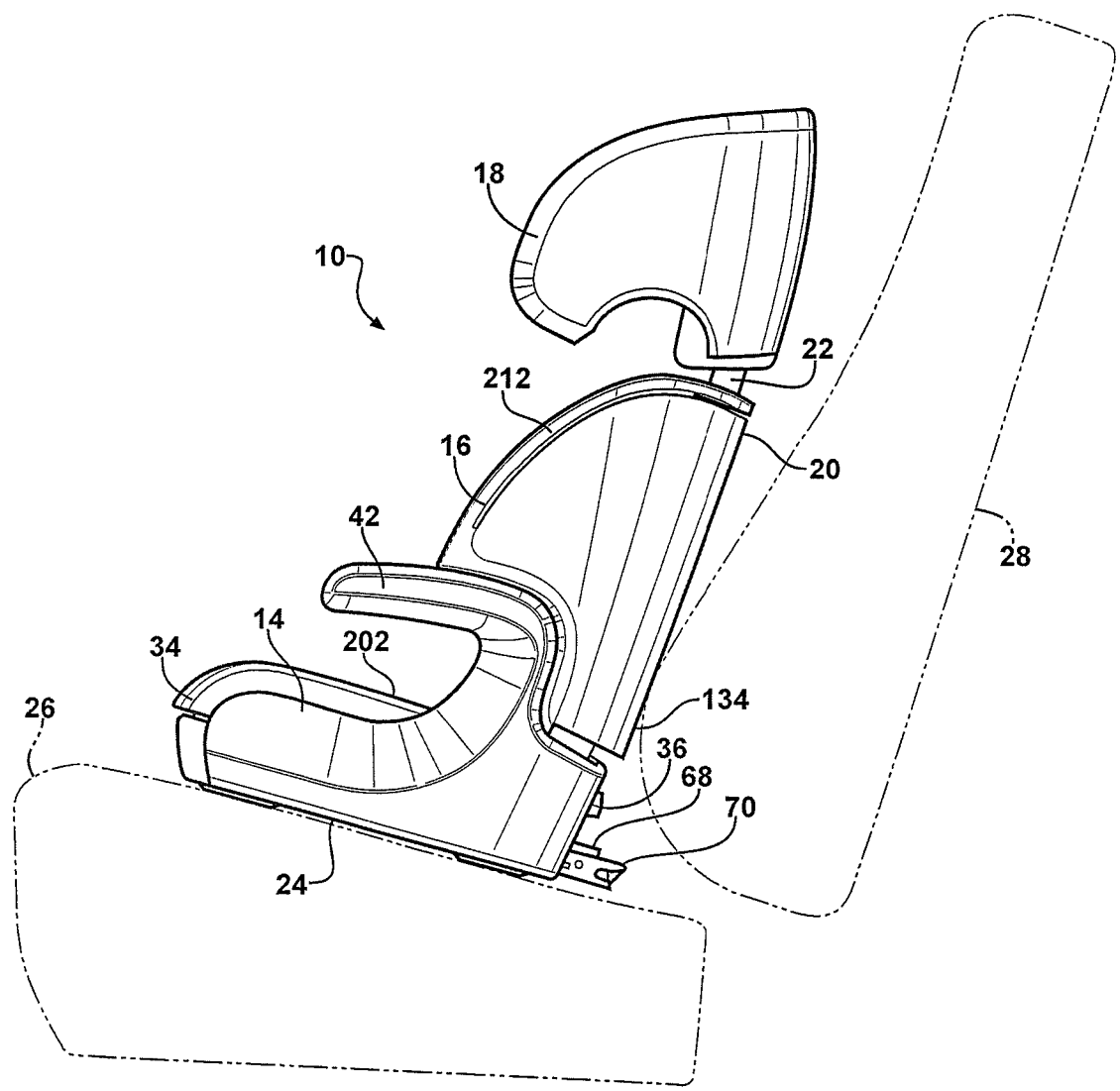
FIG. 3 is a side view of the child seat assembly with the backrest in the upright position and the base fully retracted into the seat portion.

Referring to the Figures, a child car seat, generally shown at 10 in FIGS. 1-3, includes a base 12, a seat portion 14, a backrest 16, and a headrest 18. The headrest 18 is operatively coupled to an upper end 20 of the backrest 16 by a pair of headrest posts 22 providing vertical adjustability of the headrest 18, as is well known in the art. When the seat 10 is positioned for use on a vehicle seat, a bottom surface 24 of the seat portion 14 is positioned on a seat cushion 26 of the vehicle seat and the upper end 20 of the backrest 16 and/or the headrest 18 abuts against a seat back 28 of the vehicle seat. The seat 10 is fixed to the vehicle seat with a latching system 30, as is described below in more detail.

The seat portion 14 is operatively coupled to the base 12 for sliding movement of the seat portion 14 fore and aft in a longitudinal direction relative to the base 12 to adjust a recline angle of the backrest 16. The seat portion 14 includes a generally horizontal upper seating surface 32, best seen in FIG. 4, that extends longitudinally between front and rear ends 34, 36 thereof. First and second sides 38, 40 of the seat portion 14 include an armrest 42 formed integrally therewith. Referring to the rear end 36 of the seat portion 14, shown in FIG. 5, a lower recessed surface 44 is shaped to form cavity 46 between the upper seating surface 32 and the bottom surface 24 of the seat portion 14. The cavity 46 is configured for receiving the base 12 therein.

Figure 5:
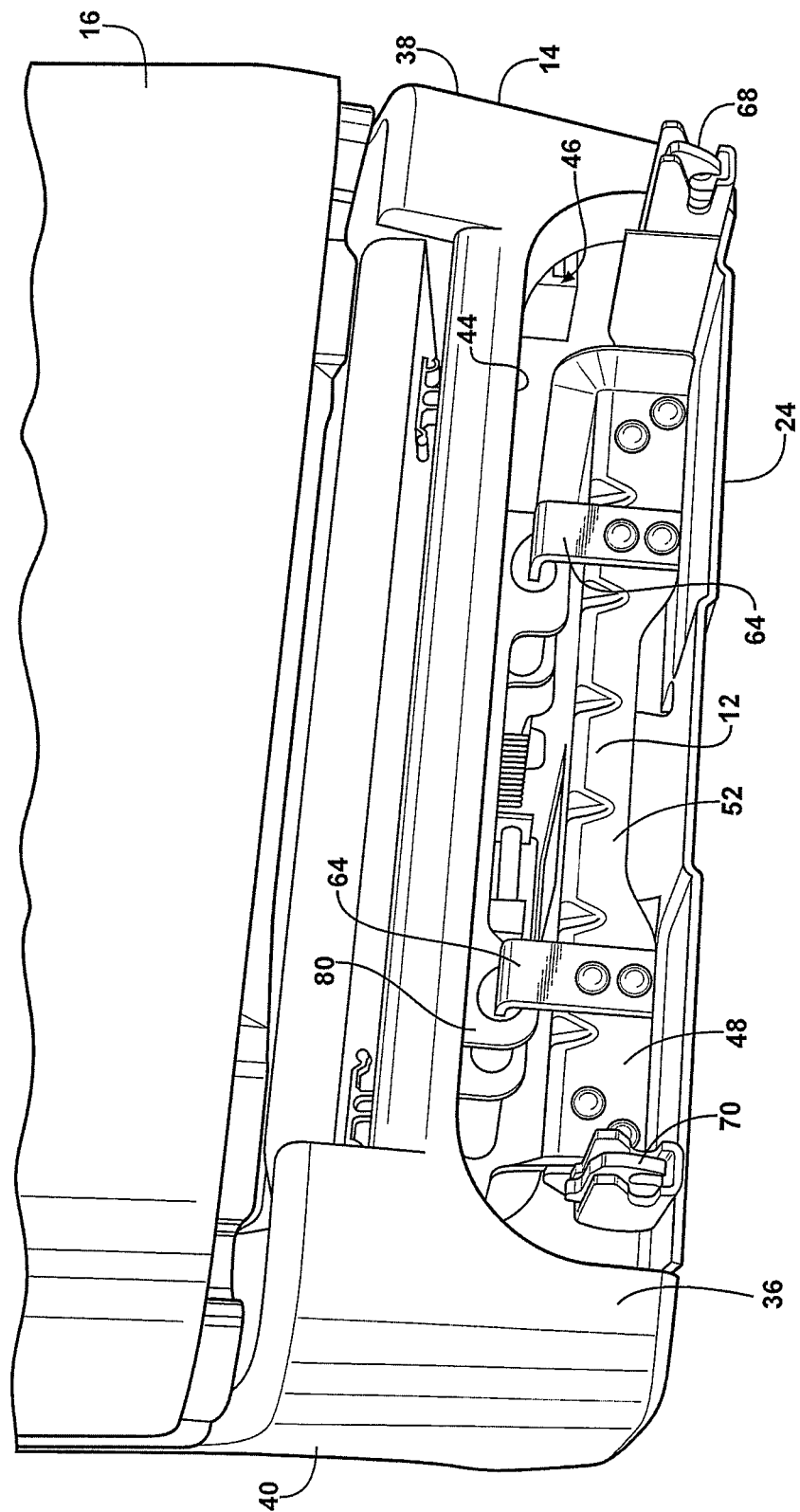
FIG. 5 is a fragmentary, rear perspective view of the child seat assembly.
Figure 6:
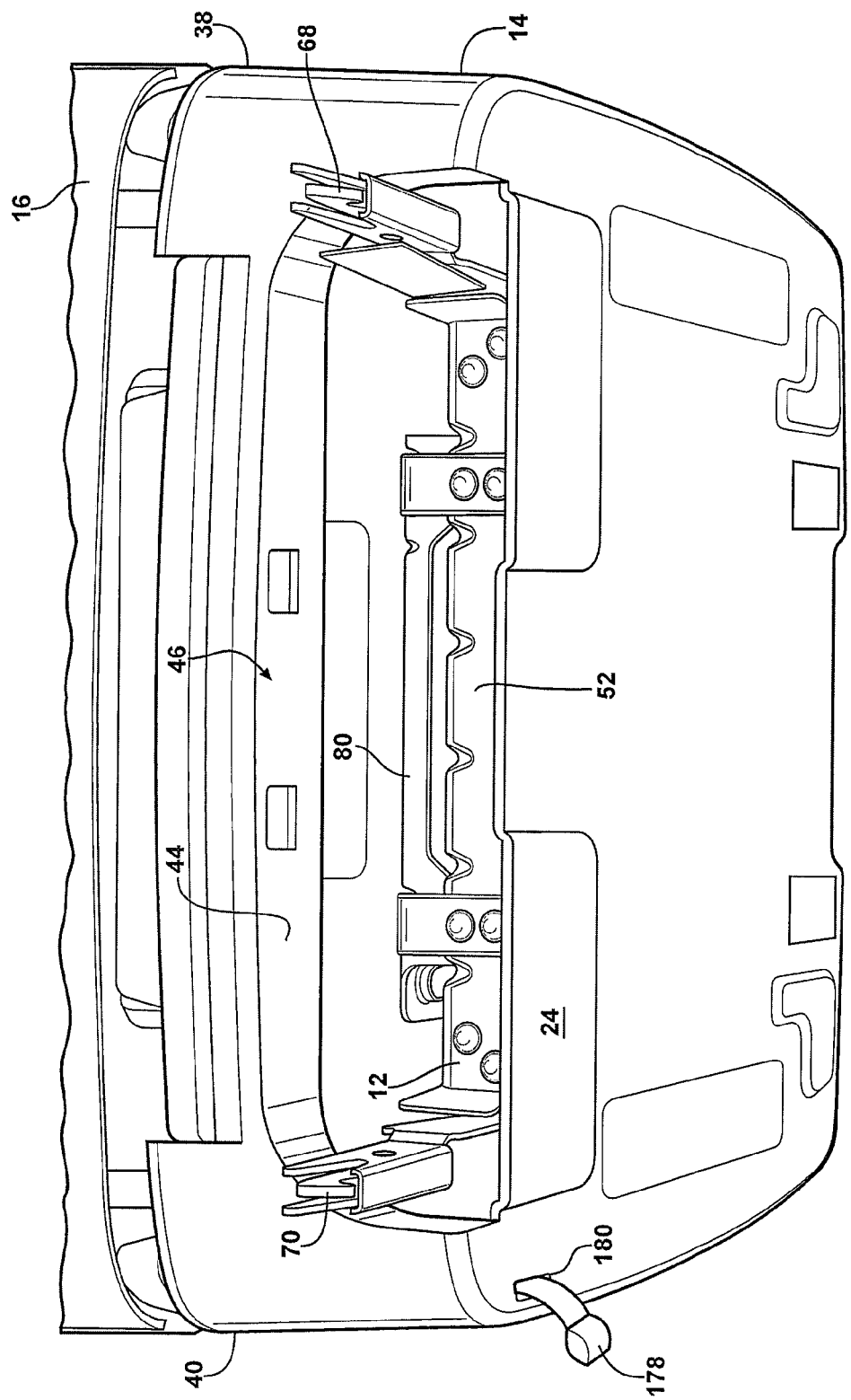
FIG. 6 is a fragmentary, bottom perspective view of the child seat assembly.
Figure 7:
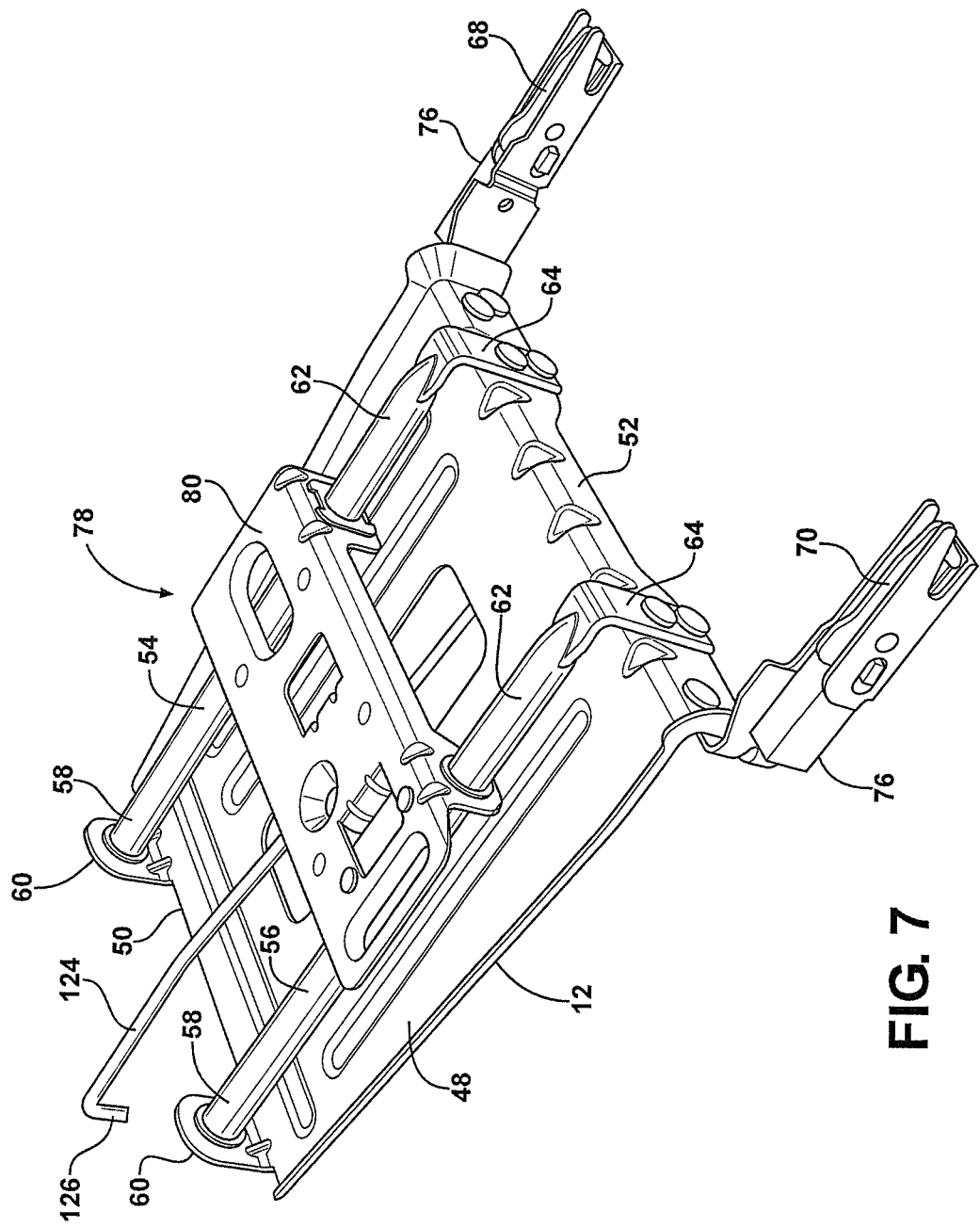
FIG. 7 is a top perspective view of the base and a slide assembly.

Referring to FIGS. 5-7, the base 12 is adapted to fit within the cavity 46 and includes a frame 48 that extends longitudinally between a forward end 50 and a rearward end 52. A first slide tube 54 and a second slide tube 56 are mounted to the base 12 and each slide tube 54, 56 extends longitudinally between the forward and rearward ends 50, 52 thereof. The first and second slide tubes 54, 56 are parallel to one another and are spaced apart in a lateral direction. A first end 58 of each of the first and second slide tubes 54, 56 is fixedly secured to an upstanding flange 60 at the forward end 50 of the frame 48. A second end 62 of each of the first and second slide tubes 54, 56 includes a foot 64 oriented perpendicular to the respective first and second slide tubes 54, 56. Each foot 64 is fixedly secured to the rearward end 52 of the frame 48. The second slide tube 56 includes a plurality of holes 66 spaced apart along its length. Each hole 66 corresponds to one of a plurality of fore and aft positions of the seat portion 14.

The latching system 30 for securing the seat 10 in place on the vehicle seat is defined by first and second ISOFIX restraint latches 68, 70 and corresponding first and second ISOFIX anchors or loop fasteners 72, 74, as shown in FIGS. 1-3. The anchors 72, 74 are rigidly mounted to the vehicle seat and are typically disposed between the seat cushion 26 and the seat back 28. The latches 68, 70 are mounted to the base 12. More specifically, the latches 68, 70 are mounted to opposite edges of the frame 48 at the rearward end 52 thereof. The latches 68, 70 lockingly engage the anchors 72, 74 to secure the seat 10 in place on the vehicle seat. The latches 68, 70 disengage with or release from the anchors 72, 74 to remove the seat 10 from the vehicle seat. Each of the latches 68, 70 include a manually operable release button 76 for actuating the latches 68, 70 to disengage with the anchors 72, 74.

Figure 8:
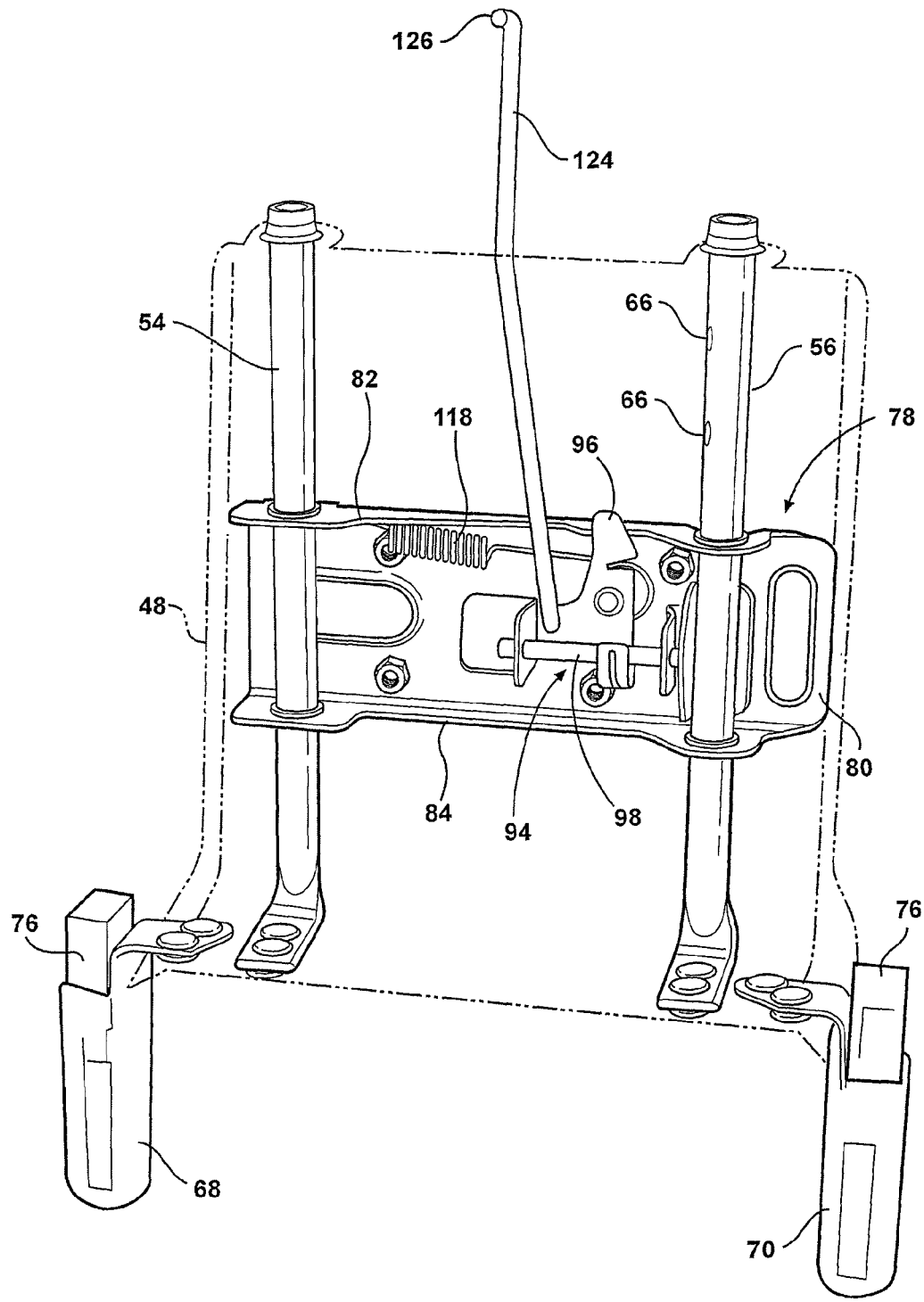
FIG. 8 is a fragmentary, bottom perspective view of the base and the slide assembly.
Figure 9:
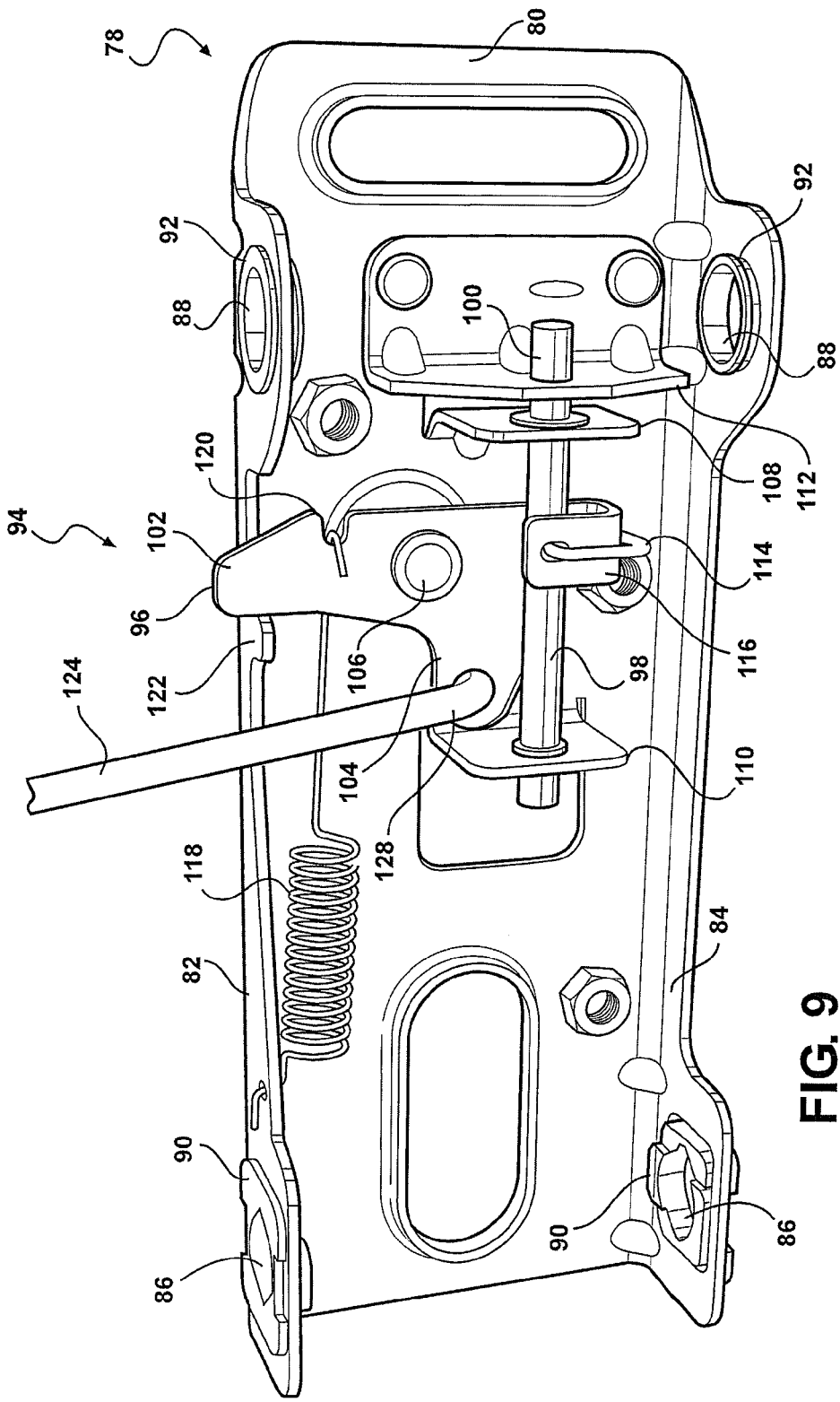
FIG. 9 is a bottom perspective view of the slide assembly.

Referring to FIGS. 7-9, a slide assembly 78 is provided for sliding the seat portion 14 fore and aft relative to the base 12 and locking the seat portion 14 in one of the plurality of fore and aft positions. The slide assembly 78 includes a slide assembly bracket 80 that is fixedly secured to the lower recessed surface 44 of the seat portion 14 and is slidably coupled to the first and second slide tubes 54, 56. A first depending transverse flange 82 extends laterally generally the entire width of the slide assembly bracket 80. A second depending transverse flange 84 extends laterally generally the entire width of the slide assembly bracket 80 and is spaced apart from the first transverse flange 82 in the longitudinal direction. Each of the first and second transverse flanges 82, 84 defines a first hole 86 for receiving the first slide tube 54 therethrough and a second hole 88 for receiving the second slide tube 56 therethrough. A compliance bushing 90 is disposed in each of the first holes 86 for receiving the first slide tube 54 therethrough and slidably guiding the slide assembly bracket 80 along the first slide tube 54. The compliance bushings 90 allow for some misalignment of the slide assembly bracket 80 and the first slide tube 54. A standard tube bushing 92 is disposed in each of the second holes 88 for receiving the second slide tube 56 therethrough and slidably guiding the slide assembly bracket 80 along the second slide tube 56. Therefore, the seat portion 14 is slidably guided along the first and second slide tubes 54, 56 between the plurality of fore and aft positions.

The slide assembly 78 also includes a locking mechanism, generally shown at 94, for selectively locking and unlocking the seat portion 14 relative to the base 12 in one of the plurality of fore and aft positions. The locking mechanism 94 includes a bell crank lever 96 that is pivotally coupled to the slide assembly bracket 80 for moving a lock shaft 98 between an extended position wherein a distal end 100 of the lock shaft 98 is engaged with one of the respective holes 66 and a retracted position wherein the distal end 100 is disengaged with the holes 66. The bell crank 96 is generally L-shaped and includes a first arm 102 and a second arm 104 forming approximately a ninety (90) degree angle therebetween. The bell crank 96 is pivotally coupled to the slide assembly bracket 80 between the first and second transverse flanges 82, 84 at pivot 106. The lock shaft 98 extends laterally and is slidably supported by first and second guide flanges 108, 110 depending from the slide assembly bracket 80. The first and second guide flanges 108, 110 are laterally spaced apart and disposed on either side of the bell crank 96. The lock shaft 98 also extends through a secondary flange 112 that is disposed between the second slide tube 56 and the first guide flange 108 to eliminate deflection of the distal end 100, which may result in unwanted disengagement of the lock shaft 98 with the holes 66. The bell crank 96 is pivotally coupled to the lock shaft 98 by a retaining pin 114 to convert pivotal movement of the bell crank 96 into linear movement of the lock shaft 98. More specifically, a coupling portion 116 extends from the second arm 104 of the bell crank 96 and partially circumferentially surrounds the lock shaft 98. The retaining pin 114 extends through the coupling portion 116 and into the lock shaft 98, thereby pivotally coupling the bell crank 96 and the lock shaft 98.

Figure 4:
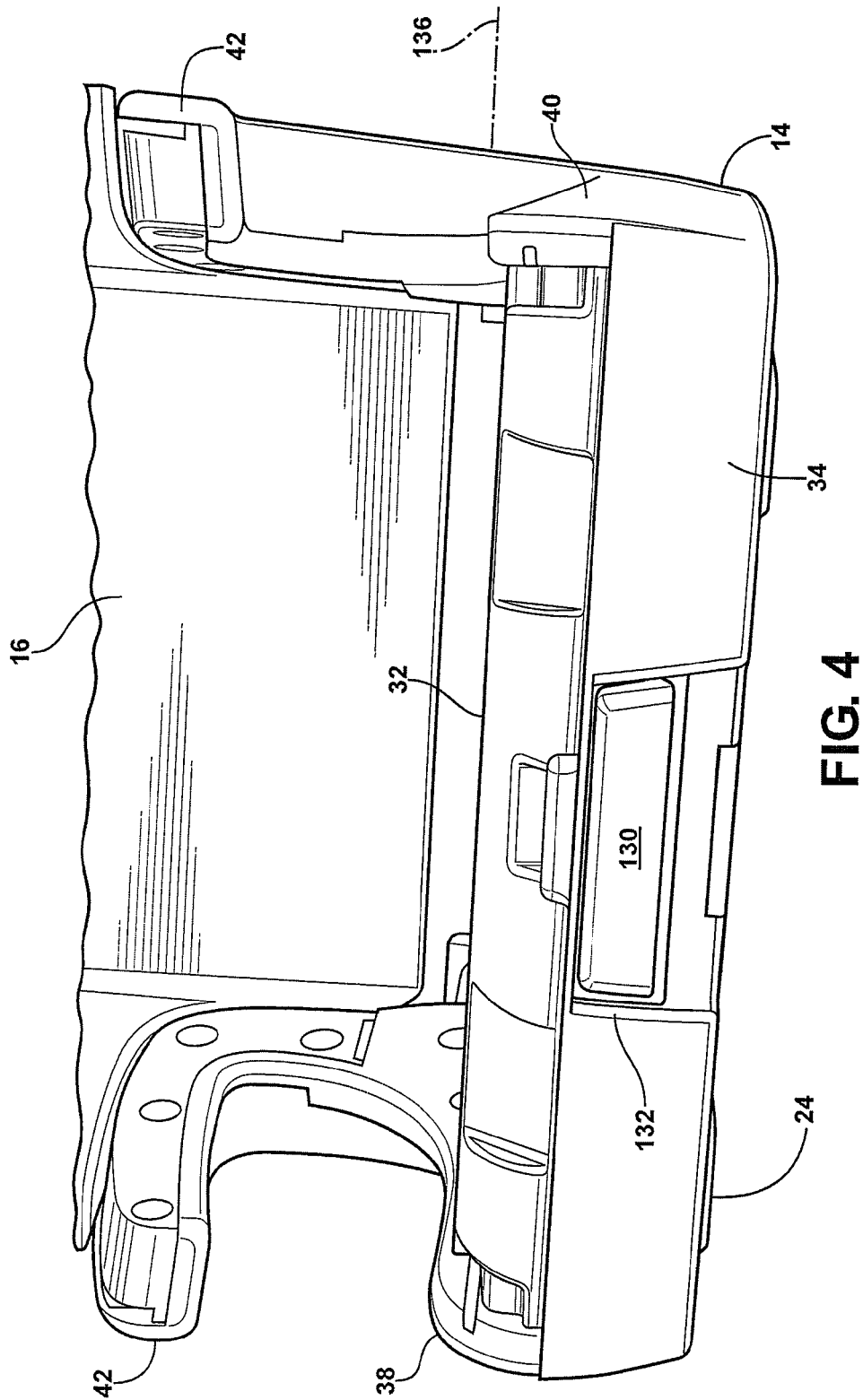
FIG. 4 is a fragmentary, front perspective view of the child seat assembly with a seat cushion removed.

The bell crank 96 is biased by a spring 118 in a first pivotal direction (counterclockwise when viewed from FIG. 9) to a lock position. The spring 118 extends between the first transverse flange 82 of the slide assembly bracket 80 and a notch 120 in the first arm 102 of the bell crank 96. In the lock position, the bell crank 96 urges the lock shaft 98 into the extended position and the first arm 102 of the bell crank 96 abuts a tab 122 defined by the first transverse flange 82. Pivoting the bell crank 96 in a second pivotal direction (clockwise when viewed from FIG. 9), to a release position, moves the lock shaft 98 from the extended position to the retracted position. The bell crank 96 is pivoted from the lock position to the release position by pulling a release rod 124 in the longitudinal direction. The release rod 124 extends between a first end 126 and a second end 128. The first end 126 is coupled to a handle 130 operatively mounted in a recess 132 at the front end 34 of the seat portion 14, as shown in FIG. 4. The second end 128 is pivotally coupled to the second arm 104 of the bell crank 96. Actuating the handle 130 pulls the release rod 124 in the longitudinal direction which causes the bell crank 96 to pivot in the second pivotal direction from the lock position to the release position, thereby moving the lock shaft 98 from the extended position to the retracted position. Therefore, the bell crank 96 transfers longitudinal movement of the release rod 124 into lateral movement of the lock shaft 98. With the lock shaft 98 in the release position, the seat portion 14 is free to move relative to the base 12 between the plurality of fore and aft positions. Once the desired fore and aft position of the seat portion 14 is selected the handle 130 is released to allow the spring 118 to return the bell crank 96 to the lock position, thereby returning the lock shaft 98 to the extended position engaged with one of the holes 66 in the second slide tube 56.

Figure 10:
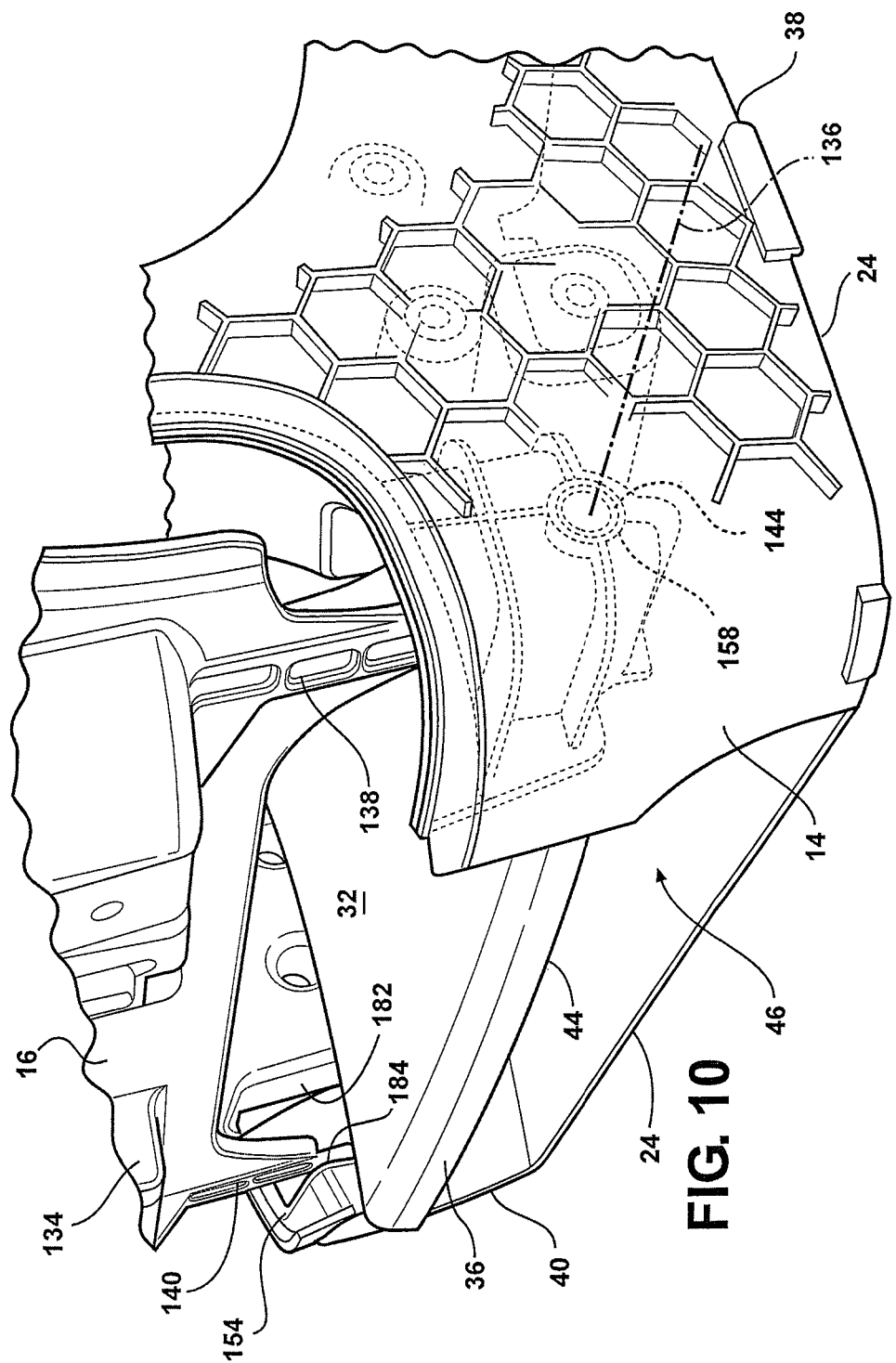
FIG. 10 is a fragmentary, right rear perspective view of the child seat assembly.
Figure 11:
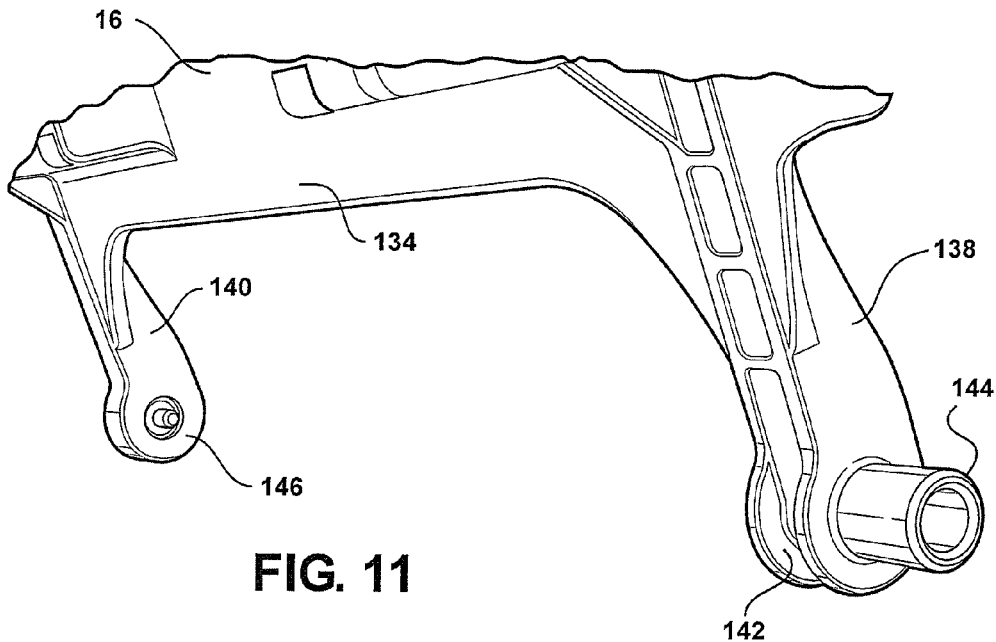
FIG. 11 is a fragmentary, right rear perspective view of the backrest.
Figure 12:
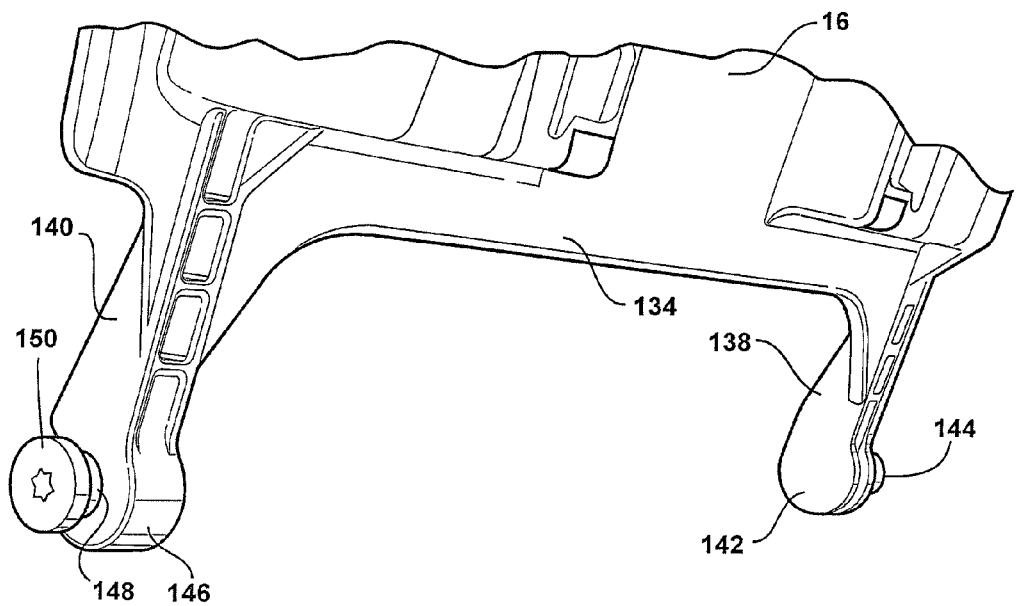
FIG. 12 is a fragmentary, left rear perspective view of the backrest.
Figure 13:
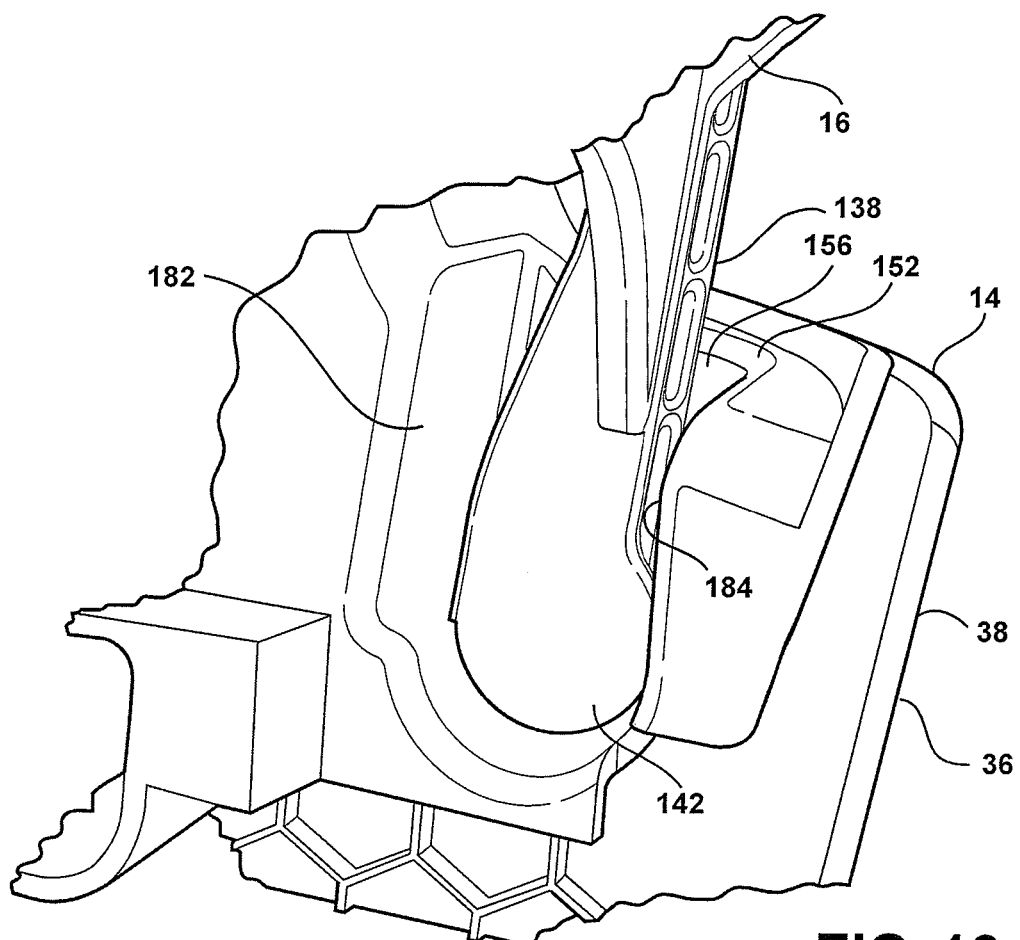
FIG. 13 is an enlarged, fragmentary, inner right rear perspective view of the backrest coupled to the seat portion.
Figure 14:
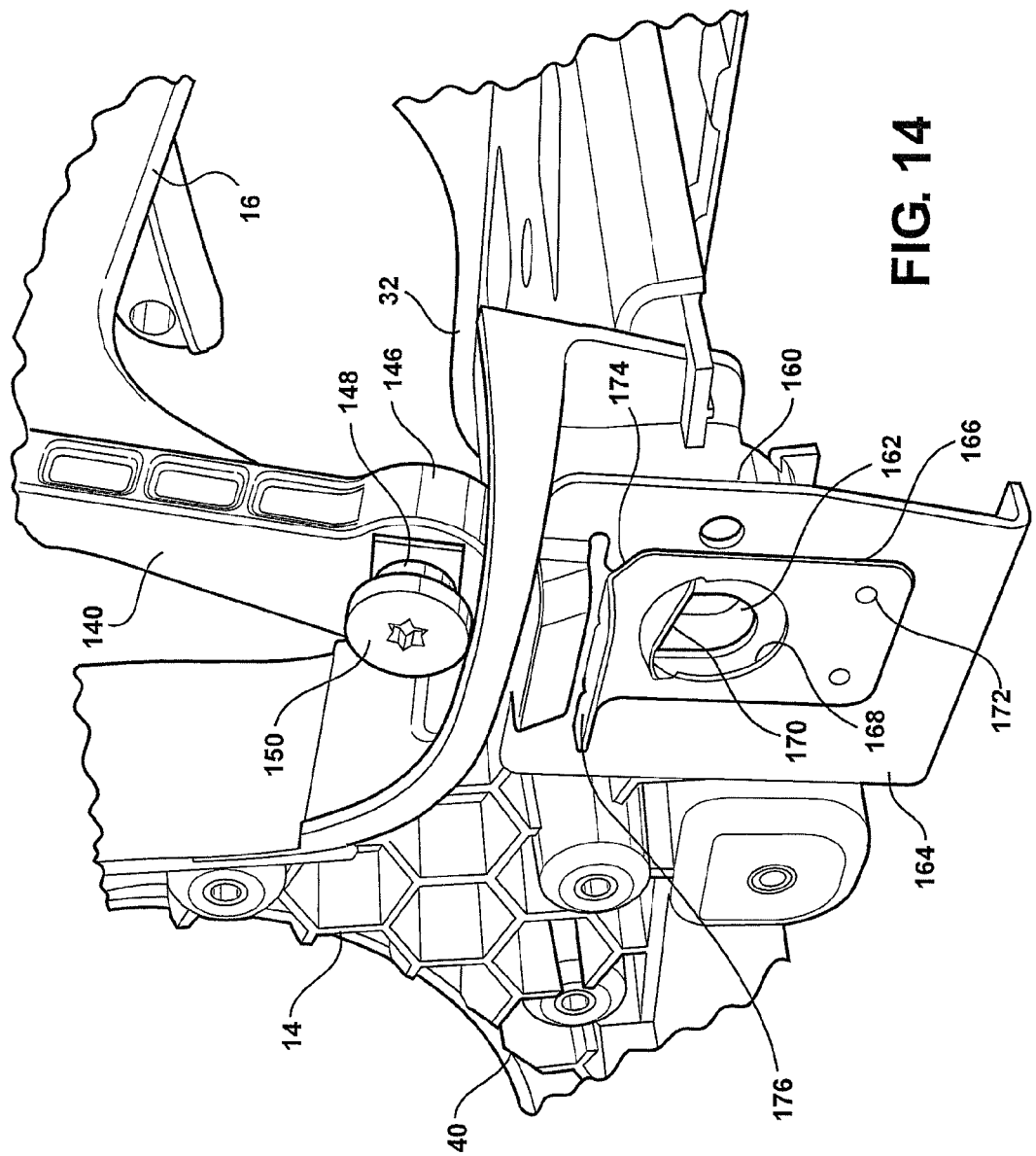
FIG. 14 is an enlarged, fragmentary, left rear perspective view of the backrest uncoupled with the seat portion.
Figure 15:
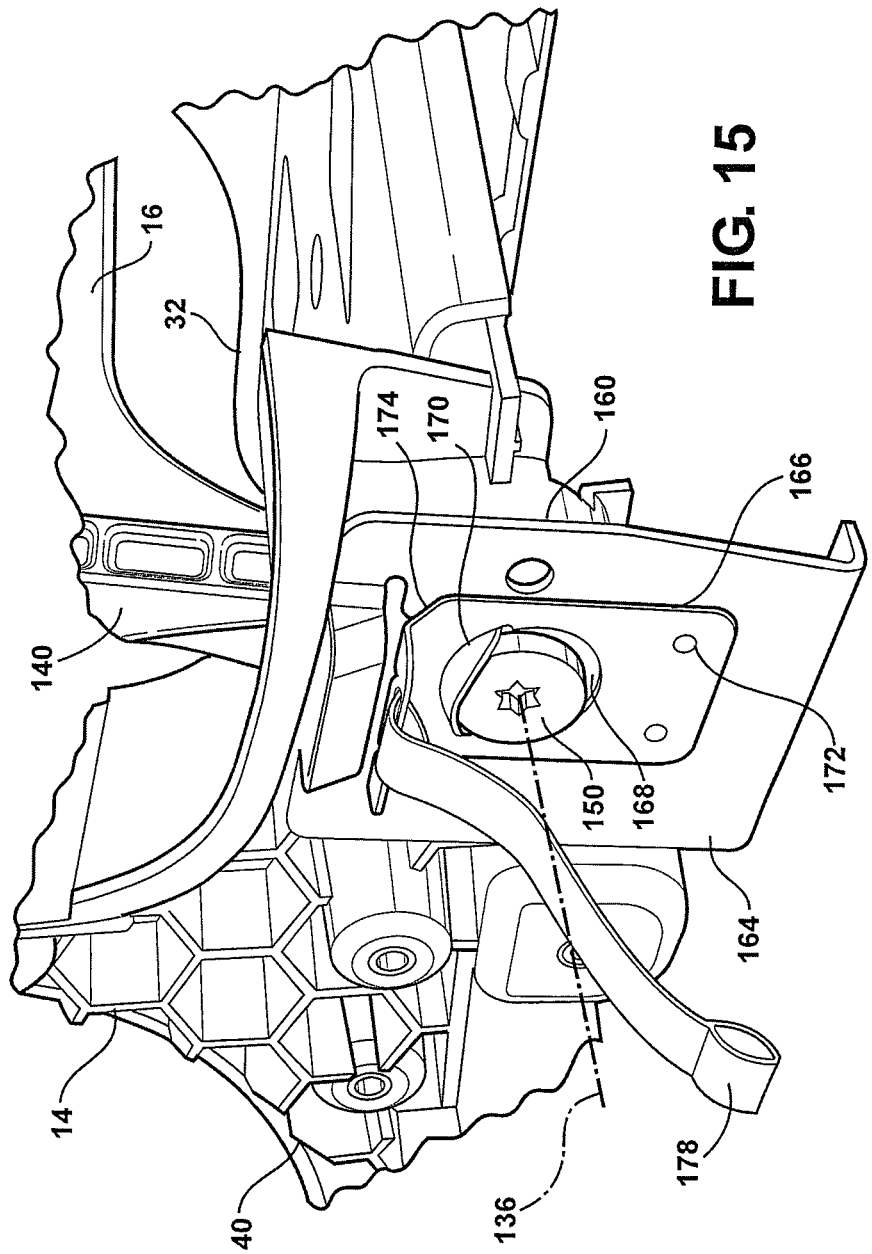
FIG. 15 is an enlarged, fragmentary, left rear perspective view of the backrest coupled with the seat portion.

A lower end 134 of the backrest 16 is pivotally coupled to the rear end 36 of the seat portion 14 for pivotal movement of the backrest 16 about a hinge axis 136 extending in the lateral direction of the seat 10, as shown in FIG. 10. Sliding the seat portion 14 fore and aft relative to the base 12 causes the recline angle of the backrest 16 to vary by pivoting the backrest 16 about the hinge axis 136. As the seat portion 14 moves fore and aft the backrest 16 pivots about the hinge axis 136 and the upper end 20 of the backrest 16 moves generally up and down against the seat back 26 of the vehicle seat.

Referring to FIGS. 10-15, the lower end 134 of the backrest 16 includes a first hinge arm 138 and a second hinge arm 140 extending therefrom. The first and second hinge arms 138, 140 are parallel to one another and are laterally spaced apart. A distal end 142 of the first hinge arm 138 includes a first hinge pin 144 extending laterally outward. A distal end 146 of the second hinge arm 140 includes a second hinge pin 148 extending laterally outward, opposite to the direction of the first hinge pin 144. The second hinge pin 148 includes an enlarged head 150 spaced apart from the second hinge arm 140. The enlarged head 150 has a circumference larger than that of the second hinge pin 148. The first and second hinge pins 144, 148 are pivotally received in corresponding first and second recesses 152, 154 formed in the seat portion 14 at the rear end 36 thereof to allow pivotal movement of the backrest 16 about the hinge axis 136. The first recess 152 is disposed adjacent to the first side 38 of the seat portion 14 and includes an outer wall 156 having a hole 158. When the backrest 16 is pivotally coupled to the seat portion 14, the first hinge pin 144 is pivotally disposed in the hole 158 in the outer wall 156 of the first recess 152. The second recess 154 is disposed adjacent to the second side 40 of the seat portion 14 and includes an outer wall 160 having a generally U-shaped slot 162. The open end of the U-shaped slot 162 faces upwardly for receiving the second hinge pin 148 therein. When the backrest 16 is pivotally coupled to the seat portion 14, the second hinge pin 148 is pivotally disposed in the U-shaped slot 162 in the outer wall 160 of the second recess 154 such that the second hinge arm 140 is disposed adjacent an inner side of the outer wall 160 and the enlarged head 150 is disposed adjacent an outer side 164 of the outer wall 160. The second hinge pin 148 is secured in the U-shaped slot 162 by a retaining flange 166 that engages the enlarged head 150. More specifically, the retaining flange 166 is flexibly mounted to the outer side 164 of the outer wall 160 to allow insertion of the second hinge pin 148 into the U-shaped slot 162 from above. The retaining flange 166 includes an aperture 168 for receiving the enlarged head 150 of the second hinge pin 148 therein. An upper edge of the aperture 168 includes a lip 170 for engaging the enlarged head 150 to secure the second hinge pin 148 in the U-shaped slot 162. The retaining flange 166 is fixedly secured at a lower edge 172 to the outer side 164 of the outer wall 160 to allow the retaining flange 166 to flex outwardly away from the outer side 164 of the outer wall 160 to receive the enlarged head 150 in the aperture 168. The retaining flange 166 also includes a guide portion 174 sloping downwardly and inwardly from a horizontally disposed release tab 176 towards the aperture 168. A first release strap 178 is fixedly secured to the release tab 176 and extends through a slot 180 in the bottom surface 24 of the seat portion 14, as shown in FIG. 6. Pulling the second release strap 178 causes the retaining flange 166 to flex outwardly away from the outer side 164 of the outer wall 160 allowing the enlarged head 150 to be released from the aperture 168 and allowing the second hinge pin 148 to be removed from the U-shaped slot 162.

To couple the backrest 16 to the seat portion 14, the backrest 16 is manipulated to insert the first hinge pin 144 into the hole 158 in the outer wall 156 of the first recess 152. The backrest 16 is further manipulated to force the enlarged head 150 of the second hinge pin 148 downwardly against the guide portion 174 of the retaining flange 166 which flexes the retaining flange 166 outwardly to allow the second hinge pin 148 to enter the U-shaped slot 162. Once the second hinge pin 148 is disposed in the U-shaped slot 162 the retaining flange 166 returns to its initial position and the lip 170 engages the enlarged head 150 to secure the second hinge pin 148 in the U-shaped slot 162. The backrest 16 is now pivotally coupled to the seat portion 14 and is free to pivot about the hinge axis 136 to vary the recline angle thereof. To decouple the backrest 16 with the seat portion 14, the first release strap 178 is pulled downwardly to flex the retaining flange 166 outwardly until the lip 170 is clear of the enlarged head 150 of the second hinge pin 148. The backrest 16 is then manipulated to pull the second hinge pin 148 upwardly out of the U-shaped slot 162. The backrest 16 is further manipulated to remove the first hinge pin 144 from the hole 158 in the outer wall 156 of the first recess 152. The backrest 16 is now separated from the seat portion 14.

The first and second recesses 152, 154 also include fore and aft walls 182, 184 that define limits of pivotal movement of the backrest 16. More specifically, the first and second hinge arms 138, 140 abut the respective fore and aft walls 182, 184 of the first and second recesses 152, 154 at the limits of pivotal movement of the backrest 16.

Several examples of using the seat 10 within a vehicle are described herein, however, these examples are not intended to define every use that is contemplated. First, with the latches 68, 70 lockingly engaging the anchors 72, 74, the locking mechanism 94 is actuated to unlock the seat portion 14 with the base 12 to allow sliding adjustment of the seat portion 14 between the plurality of fore and aft positions, thereby adjusting the recline angle of the backrest 16. Second, with the latches 68, 70 lockingly engaging the anchors 72, 74 and the locking mechanism 94 locking the seat portion 14 with the base 12 in one of the plurality of fore and aft positions, the seat back 28 of the vehicle seat is reclined, thereby adjusting the recline angle of the backrest 16. Third, depending on how far the anchors 72, 74 protrude from between the seat cushion 26 and seat back 28 it may be necessary to extend the latches 68, 70 in order to allow the latches 68, 70 to lockingly engage the anchors 72, 74 when the seat 10 is positioned on the vehicle seat, as shown in FIG. 2. In this case, the locking mechanism 94 is actuated to unlock the seat portion 14 with the base 12 to allow the base 12 and latches 68, 70 to extend far enough from the seat portion 14 to lockingly engage the anchors 72, 74. Fourth, in a vehicle without anchors 72, 74, the locking mechanism 94 is actuated to unlock the seat portion 14 with the base 12 to retract the base 12 into the seat portion 14, thereby containing the latches 68, 70 at least partially within the cavity 46 of the seat portion 14, as shown in FIG. 3.

Figure 16:
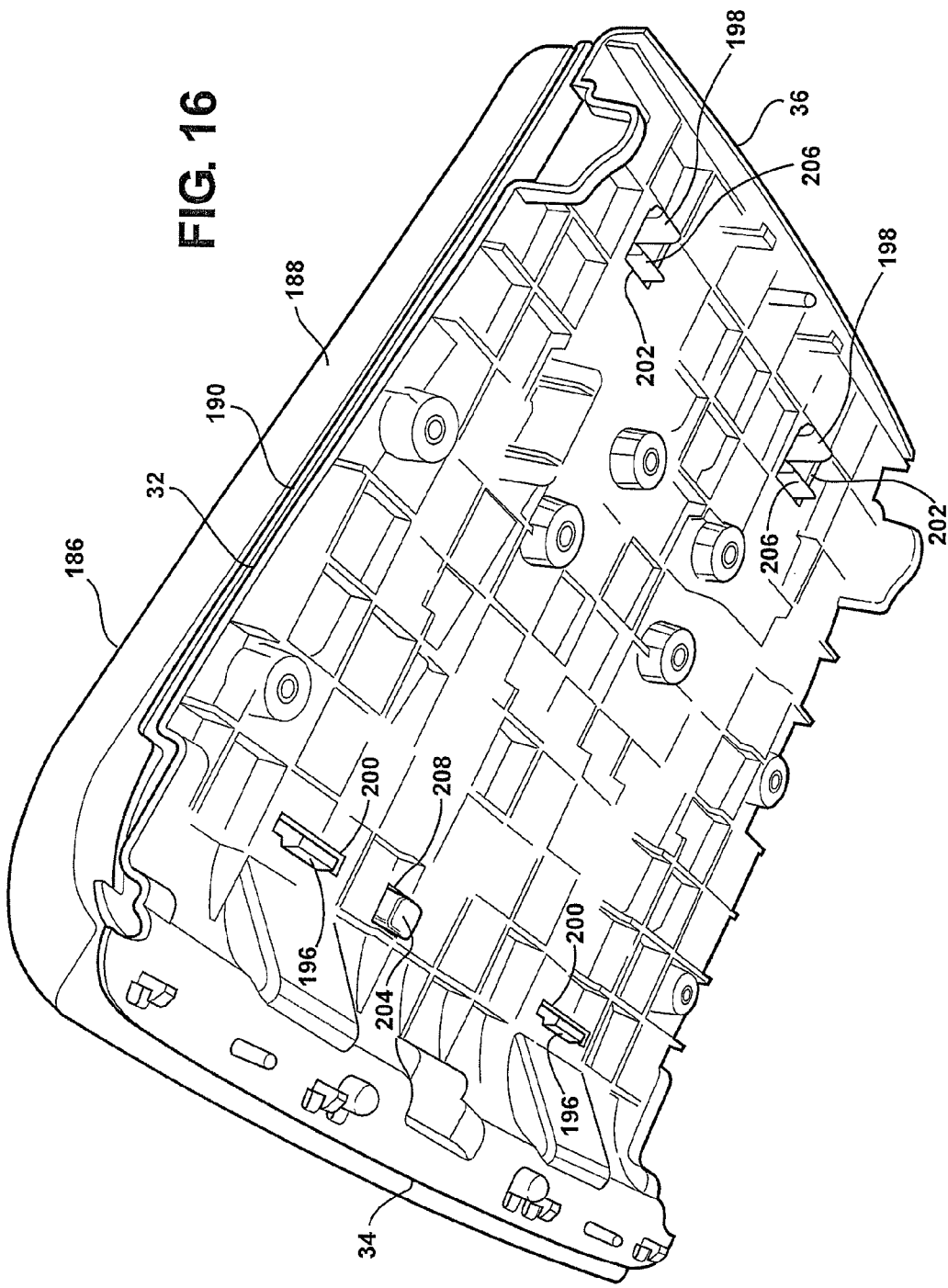
FIG. 16 is a fragmentary, bottom perspective view of the seat portion including a seat cushion.
Figure 17:
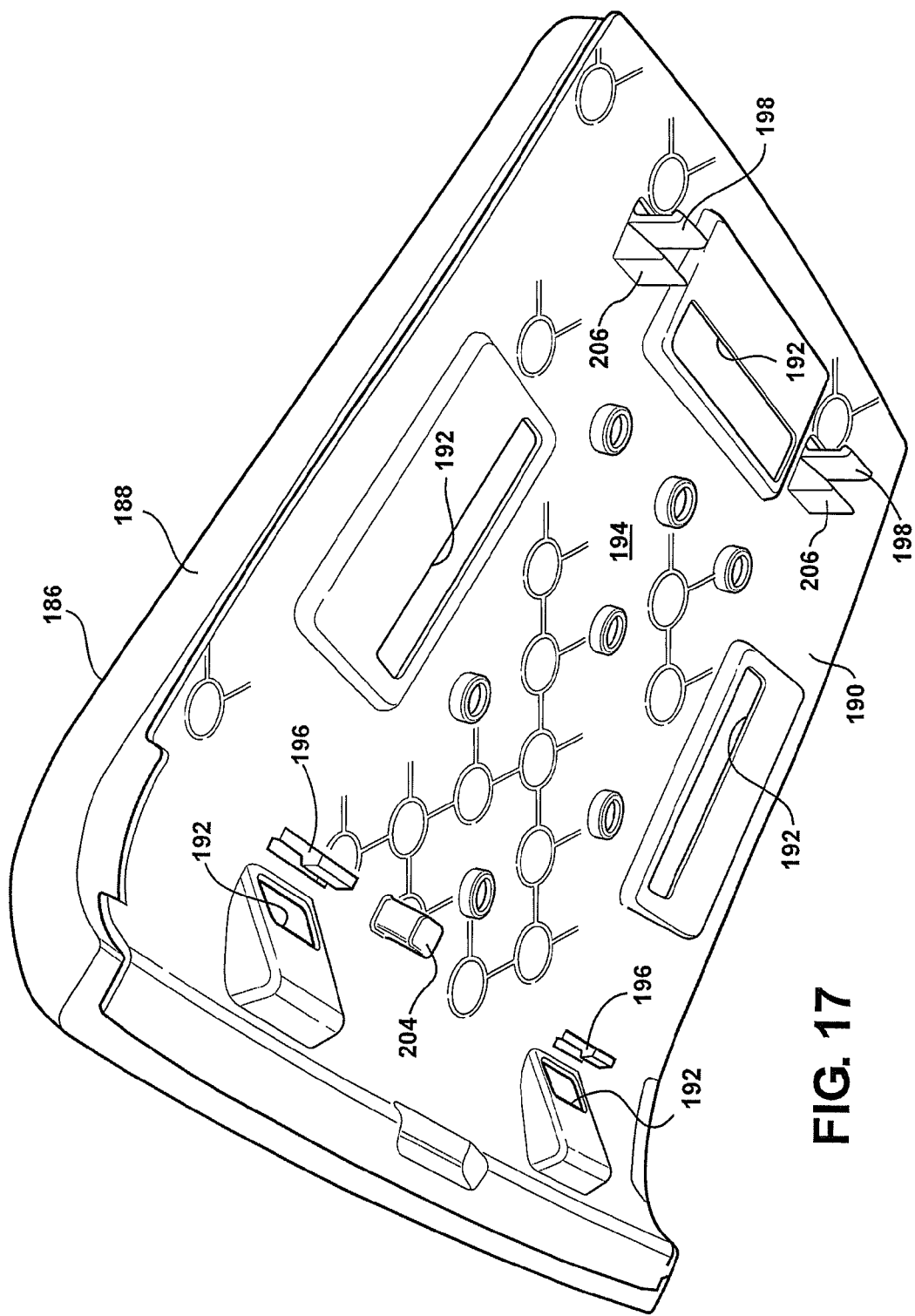
FIG. 17 is a bottom perspective view of the seat cushion including a backing plate.

Referring to FIGS. 16 and 17, a seat portion cushion 186 is coupled to the upper seating surface 32 of the seat portion 14 for added comfort. The seat portion cushion 186 includes a contoured foam pad 188 mounted to a backing plate 190 that is covered on an upper seating side by a trim cover (not shown). In one embodiment the pad 188 may be formed from expanded polypropylene, however, it is appreciated that the material of the pad 188 does not vary the scope of the invention. The trim cover extends over the pad 188, wraps around the edges of the backing plate 190 and is secured to a plurality of slots 192 on an underside 194 of the backing plate 190 with a plurality of J-strips (not shown) or other similar trim cover retaining means, as is well known in the art. The seat portion cushion 186 is releasably coupled to the upper seating surface 32 of the seat portion 14 for easy removal in order to allow the trim cover to be removed for washing. In the embodiment shown, the underside 194 of the backing plate 190 includes a pair of forwardly-facing clips 196 and a pair of rearwardly-facing clips 198 adapted for engaging suitable apertures in the upper seating surface 32. The forwardly-facing clips 196 releasably engage with a pair of first retaining apertures 200 in the upper seating surface 32 adjacent the front end 34 thereof. Similarly, the rearwardly-facing clips 198 releasably engage with a pair of second retaining apertures 202 in the upper seating surface 32 adjacent the rear end 36 thereof. The underside 194 of the backing plate 190 also includes a first locating tab 204 and a pair of second locating tabs 206. The first locating tab 204 is disposed between the pair of forwardly-facing clips 196 and locates the seat portion cushion 186 by engaging with a first locating aperture 208 in the upper seating surface 32 adjacent the front end 34 thereof. Similarly, the second locating tabs 206 are disposed adjacent the rearwardly-facing clips 196 and locate the seat portion cushion 186 by engaging with the second retaining apertures 202 in the upper seating surface 32 adjacent the rear end 36 thereof. The first and second locating tabs 204, 206 and the corresponding first locating apertures 208 and second retaining apertures 202 are arranged such that the seat portion cushion 186 must be correctly oriented with respect to the seat portion 14 to be coupled thereto.

Similarly, a backrest cushion 212 is coupled to the backrest 16 and includes a contoured foam pad covered by a trim cover (not shown). The trim cover extends over the pad, wraps around the edges of the backrest 16, and is secured to a backside of the backrest 16 with a plurality of J-strips (not shown) or other similar trim cover retaining means, as is well known in the art.

Figure 18:
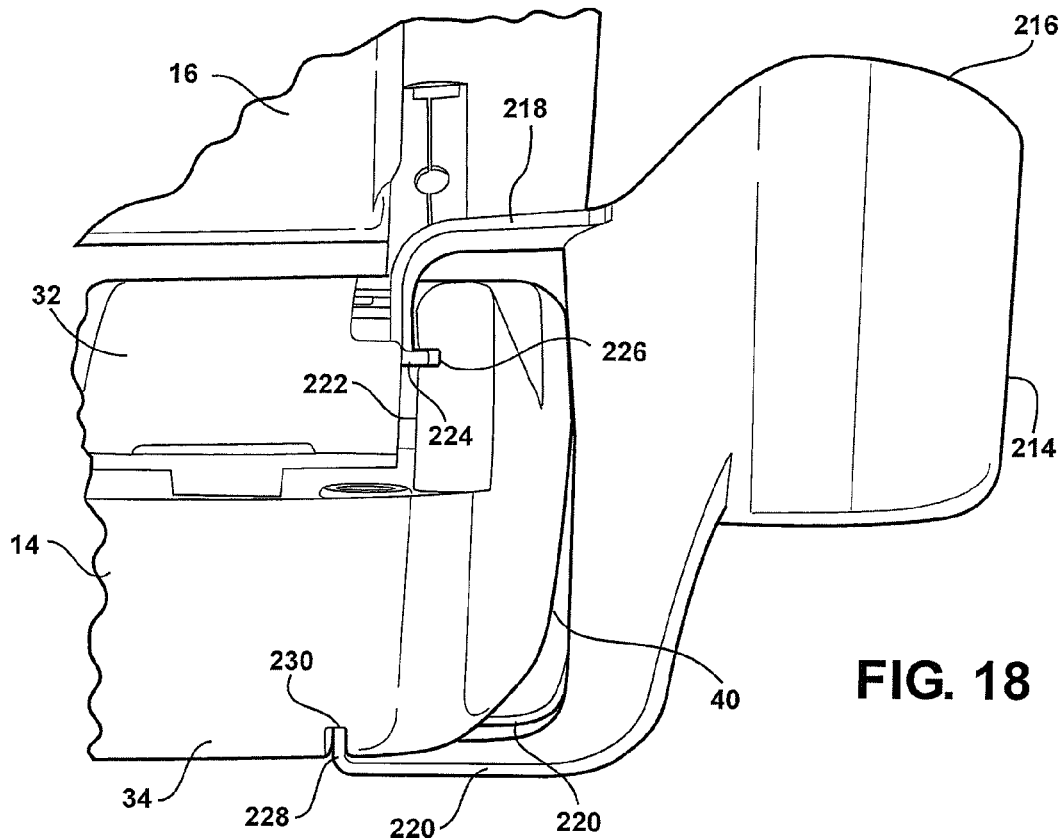
FIG. 18 is a fragmentary, front perspective view of the child seat assembly including a cup holder.
Figure 19:
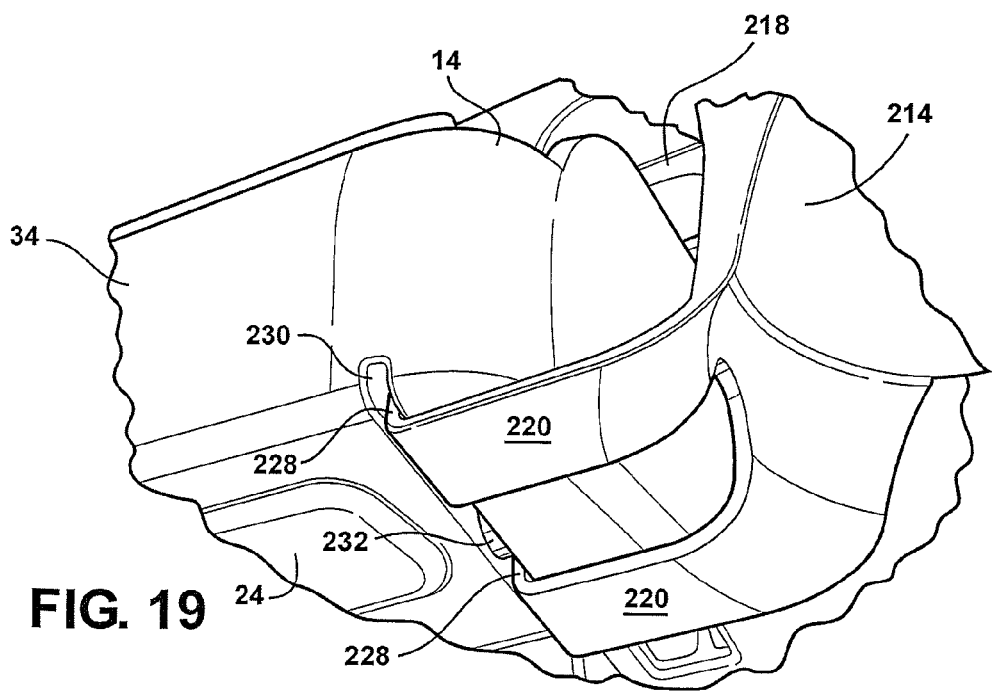
FIG. 19 is a fragmentary, bottom perspective view of the child seat assembly including the cup holder.

Referring to FIGS. 18 and 19, a cup holder or other storage device 214 is adapted to be releasably coupled to one of the first and second sides 38, 40 of the seat portion 14. In the embodiment shown, the cup holder 214 is coupled to the second side 40 of the seat portion 14. The cup holder 214 includes a receptacle portion 216 for receiving a suitable drink container therein. The cup holder 214 also includes an upper arm 218 and at least one lower arm 220. In the embodiment shown, the cup holder 214 includes a pair of lower arms 220. The upper arm 218 extends laterally above the second side 40 of the seat portion 14, then extends downwardly adjacent an inner side 222 of the second side 40, and terminates at an upper tab 224 extending back toward the receptacle portion 216. The upper tab 224 engages an upper slot 226 formed in the inner side 222 of the second side 40 of the seat portion 14. The upper slot 226 begins at the front end 34 of the seat portion 14 and extends longitudinally along the inner side 222. Each lower arm 220 extends downwardly from the receptacle portion 216, then extends laterally below the second side 40 of the seat portion 14, and terminates at an upstanding lower tab 228 for engaging a lower slot 230 formed in the bottom surface 24 of the seat portion 14. The lower tab 228 is generally perpendicular to the upper tab 224. The lower slot 230 begins at the front end 34 of the seat portion 14 and extends longitudinally along the bottom surface 24 of the seat portion 14. The cup holder 214 is coupled to the seat 10 by aligning the upper and lower tabs 224, 228 with the respective upper and lower slots 226, 230 and sliding the cup holder 214 longitudinally toward the backrest 16 until the upper and lower tabs 224, 228 are fully engaged with the upper and lower slots 226, 230. The lower slot 230 includes a detent 232 such that the lower tab 228 on at least one of the lower arms 220 is disposed rearwardly of the detent 232 to prevent the cup holder 214 from inadvertently decoupling with the seat 10. Thus, the detent 232 helps retain the cup holder 214 in place. To remove the cup holder 214 from the seat 10, the reverse sliding movement is used to move the lower tab 228 forwardly past the detent 232 and disengage the upper and lower tabs 224, 228 with the respective upper and lower slots 226, 230.

Figure 20:
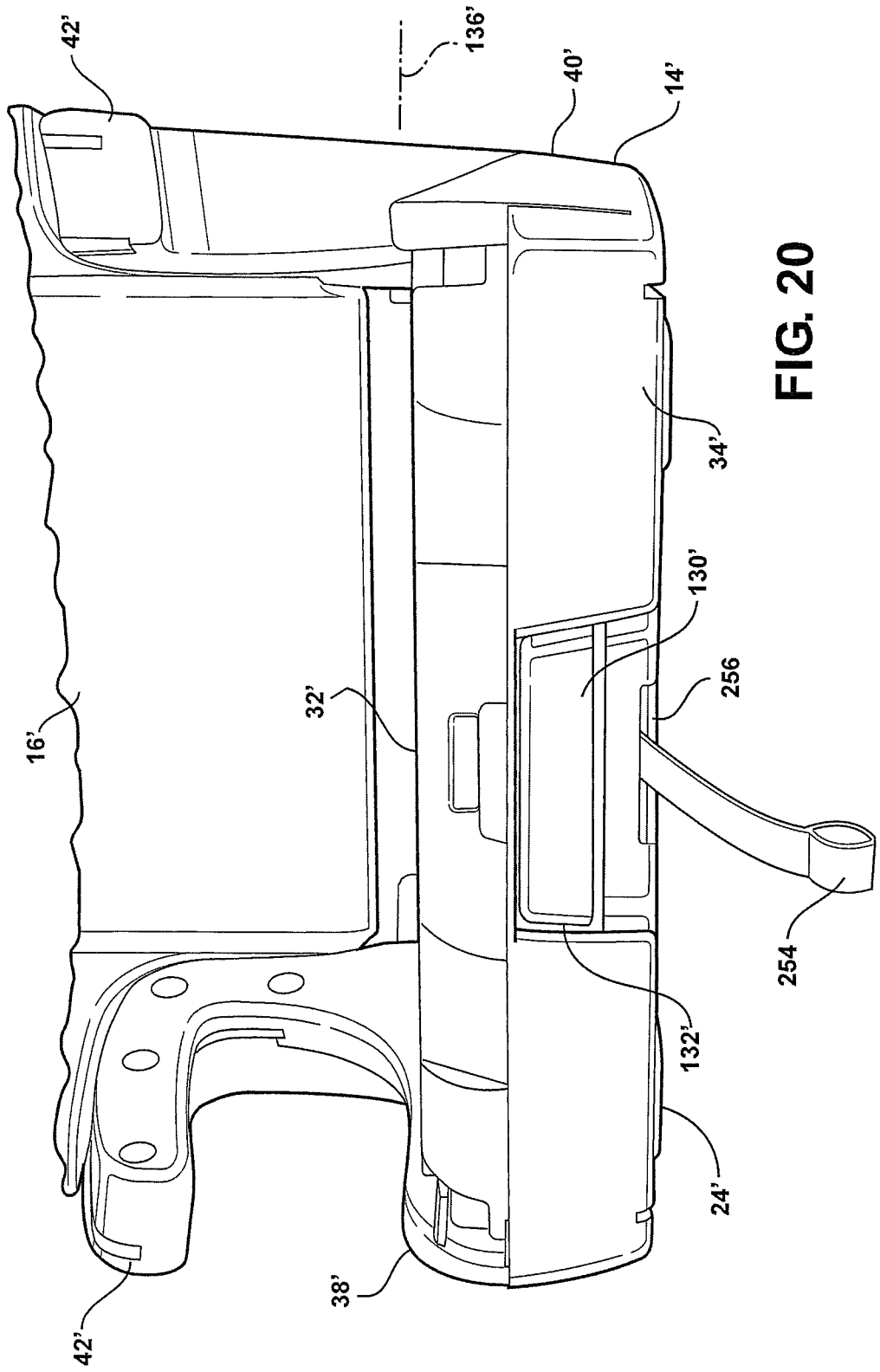
FIG. 20 is a fragmentary, front perspective view of a child seat assembly according to a second embodiment of the invention with a seat cushion removed.
Figure 21:
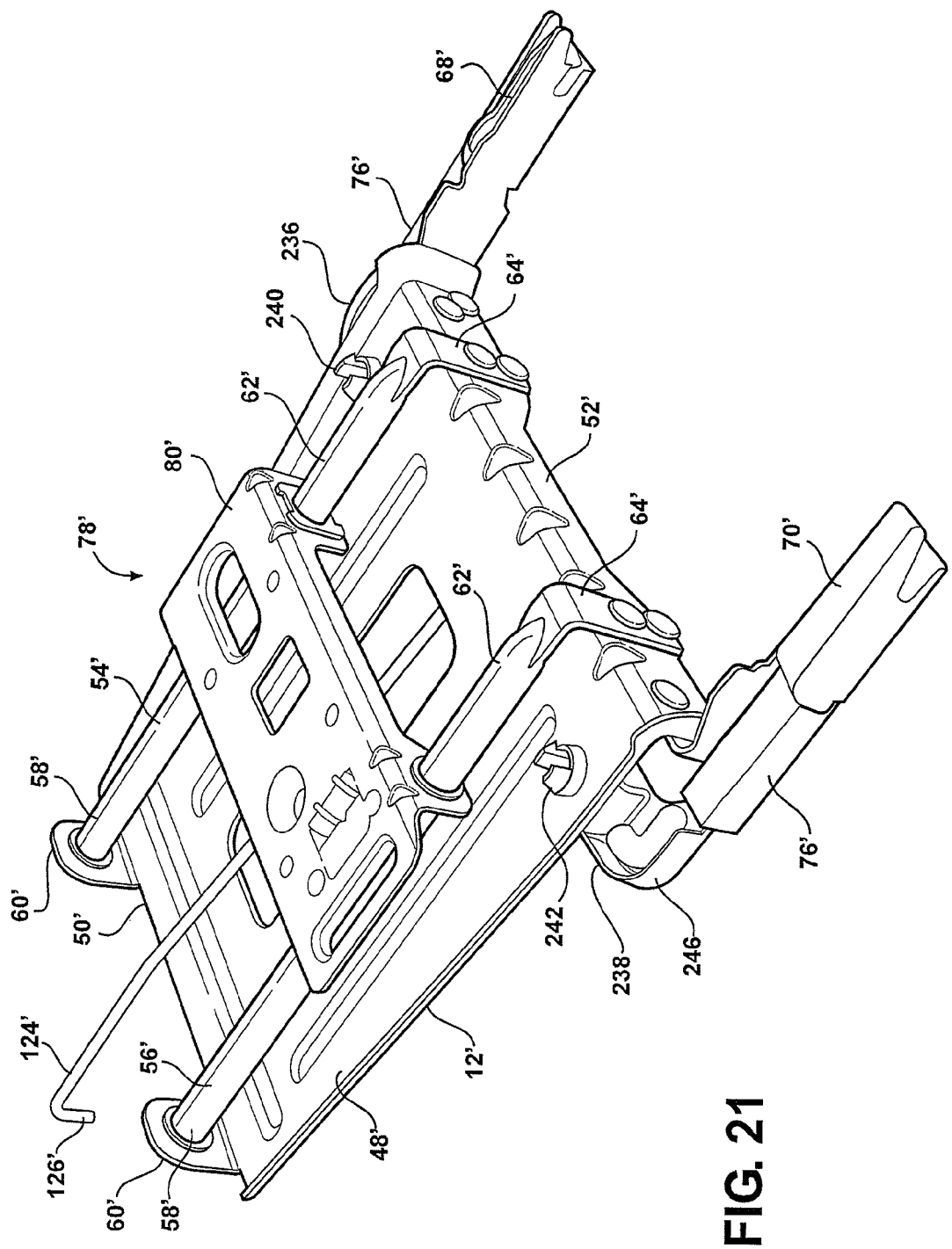
FIG. 21 is a top perspective view of a base and a slide assembly of the second embodiment.
Figure 22:
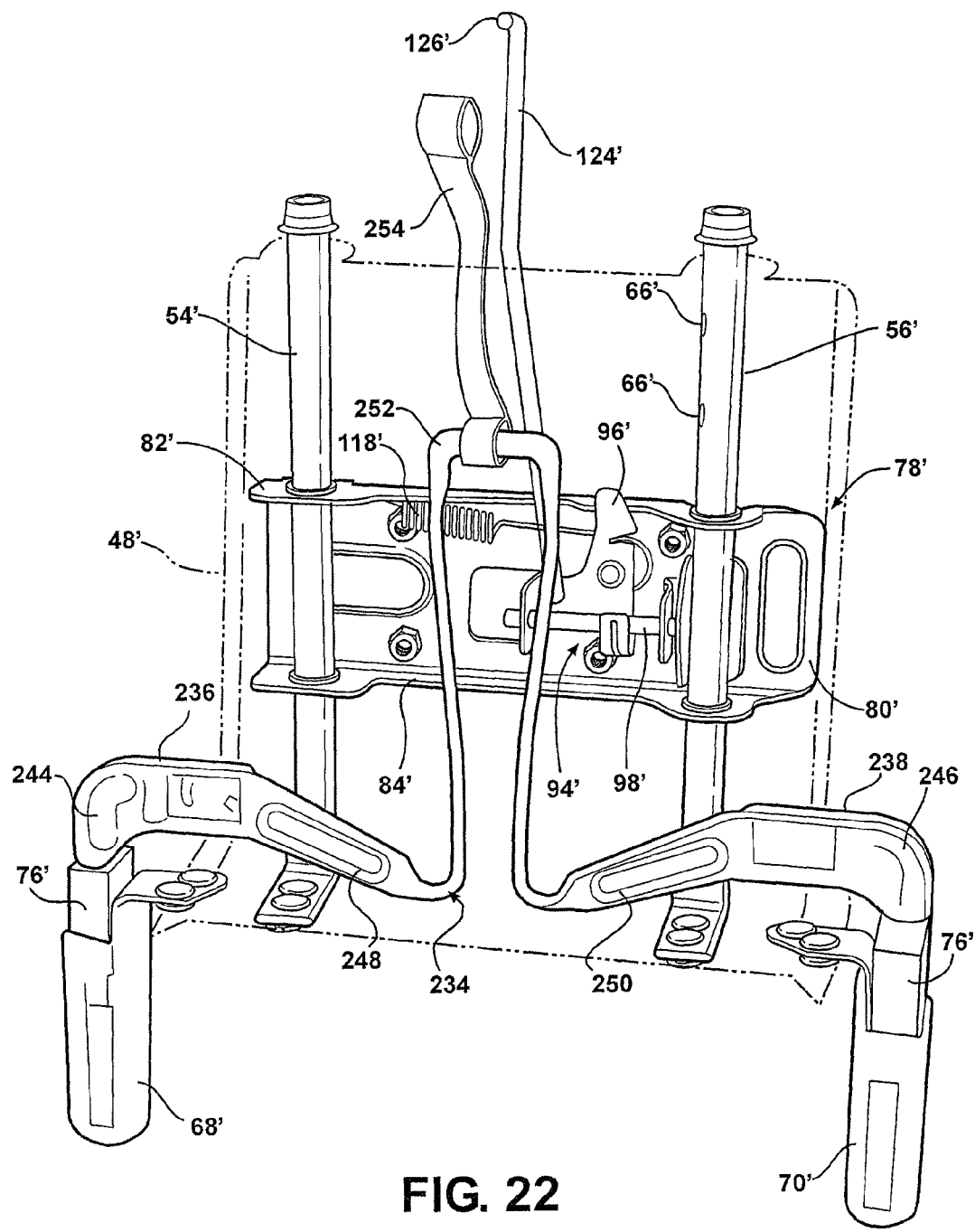
FIG. 22 is a fragmentary, bottom perspective view of the base and the slide assembly of the second embodiment.

Referring to FIGS. 20 through 22, wherein like primed reference numerals represent similar elements as those disclosed above, in a second embodiment of the invention a release mechanism 234 is provided to disengage the latches 68', 70' from the anchors 72', 74' when it is desired to remove the seat 10' from the vehicle seat. The release mechanism 234 is an integrally formed, flexible plastic piece that includes a first lever portion 236 and a second lever portion 238 pivotally coupled to the frame 48' of the base 12' at first and second pivots 240, 242, respectively. An outer end 244 of the first lever portion 236 is adapted such that pivoting the first lever portion 236 in the first pivotal direction (counterclockwise when viewed from FIG. 22) pushes the release button 76' of the latch 68' and causes the latch 68' to disengage with the anchor 72'. Similarly, an outer end 246 of the second lever portion 238 is adapted such that pivoting the second lever portion 238 in the second pivotal direction (clockwise when viewed from FIG. 22) pushes the release button 76' of the latch 70' and causes the latch 70' to disengage with the anchor 74'. Inner ends 248, 250 of the first and second lever portions 236, 238 are coupled together by a middle portion 252 for simultaneously pivoting the first and second lever portions 236, 238 to push the release button 76' of the respective latches 68', 70'. The middle portion 252 extends towards the forward end 50' of the frame 48' and a second release strap 254 is fixedly secured thereto. The second release strap 254 extends through a slot 256 in the front end 34' of the seat portion 14' generally below the recess 132' with the handle 130'. Pulling the second release strap 254 pulls the middle portion 252, which causes the first lever portion 236 to pivot in the first pivotal direction and the second lever portion 238 to pivot in the second pivotal direction, thereby releasing the latches 68', 70' from the anchors 72', 74'.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A child seat assembly for use on a vehicle seat, said child seat assembly comprising:

a seat portion adapted to be supported on the vehicle seat, said seat portion including a cavity, a first recess having a hole, and a second recess having an upwardly facing slot;

a base disposed at least partially within said cavity of said seat portion, said seat portion operatively coupled to said base for selective sliding movement of said seat portion in a longitudinal direction relative to said base;

a backrest pivotally coupled to said seat portion, said backrest being releasably coupled to the seat portion and configured to pivot about an axis extending in a lateral direction through the seat portion in response to said sliding movement of relative to said base, said backrest including a first hinge arm having a first hinge pin extending in said lateral direction and a second hinge arm having a second hinge pin extending in said lateral direction opposite said first hinge pin, wherein said first hinge pin is pivotally disposed in said hole and said second hinge pin is pivotally disposed in said upwardly facing slot; and a flange flexibly coupled to said seat portion and engaging an enlarged head of said second hinge pin thereby retaining said second hinge pin in said upwardly facing slot, wherein said flange flexes outwardly to disengage with said enlarged head of said second hinge pin to release said second hinge pin from said upwardly facing slot.

2. A child seat assembly as set forth in claim 1 wherein said seat portion includes a seating surface, a lower recessed surface opposite said seating surface and a bottom surface adapted to be supported directly on the vehicle seat, said lower recessed surface and said bottom surface defining said cavity therebetween.

3. A child seat assembly as set forth in claim 1 wherein said base includes a pair of slide tubes extending in said longitudinal direction, said seat portion operatively coupled to said pair of slide tubes thereby guiding said seat portion relative to said base in said longitudinal direction.

4. A child seat assembly as set forth in claim 3 wherein said slide assembly includes a bracket fixedly secured to said seat portion and slidably coupled to said pair of slide tubes, a lever pivotally coupled to said bracket and biased in a first direction urging a lock shaft to an extended position engaged with one of said pair of slide tubes thereby preventing said sliding movement of said seat portion, said lever pivotal in a second direction moving said lock shaft to a retracted position disengaged with said one of said pair of slide tubes thereby allowing said sliding movement of said seat portion between a plurality of fore and aft positions.

5. A child seat assembly as set forth in claim 4 wherein said lever includes a first arm and a second arm, said second arm including a coupling portion pivotally coupled with said lock shaft.

6. A child seat assembly as set forth in claim 5 including an extension spring coupled directly between said first arm of said lever and said bracket of said slide assembly.

7. A child seat assembly as set forth in claim 6 including a rod pivotally coupled to said second arm of said lever, wherein pulling said rod in said longitudinal direction pivots said lever in said second direction, thereby moving said lock shaft in said lateral direction to said retracted position.

8. A child seat assembly as set forth in claim 2 including a seat portion cushion removably coupled to said seating surface of said seat portion.

9. A child seat assembly as set forth in claim 1 including a pair of latches fixedly secured to said base, said pair of latches adapted for releasably securing said child seat assembly to the vehicle seat.

10. A child seat assembly as set forth in claim 9 including a release mechanism operatively coupled to said pair of latches for simultaneously actuating said pair of latches to release said child seat assembly from the vehicle seat.

11. A child seat assembly as set forth in claim 10 wherein said release mechanism includes first and second lever portions pivotally coupled to said base at first and second pivots, said first lever portion operatively engaging one of said pair of latches and said second lever portion operatively engaging another of said pair of latches.

12. A child seat assembly as set forth in claim 11 wherein said first and second lever portions pivot in opposite directions in response to pulling said release mechanism in said longitudinal direction.

13. A child seat assembly as set forth in claim 1 including a storage device removably coupled with said seat portion, said seat portion including a first slot disposed horizontally and a second slot disposed vertically, and said storage device including a first tab slidably engageable with said first slot and a second tab slidably engageable with said second slot.

* * * * *